US012641648B2

(12) United States Patent
Cheng et al.

(10) Patent No.: US 12,641,648 B2
(45) Date of Patent: May 26, 2026

(54) RANDOM ACCESS CHANNEL PARAMETER PRIORITIZATION WITH NETWORK SLICE DIFFERENTIATION AND ACCESS IDENTITY DIFFERENTIATION

(71) Applicant: QUALCOMM Incorporated, San Diego, CA (US)

(72) Inventors: Peng Cheng, Beijing (CN); Linhai He, San Diego, CA (US); Miguel Griot, La Jolla, CA (US); Ravi Agarwal, San Diego, CA (US); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 437 days.

(21) Appl. No.: 18/254,317

(22) PCT Filed: Jan. 14, 2021

(86) PCT No.: PCT/CN2021/071765
§ 371 (c)(1),
(2) Date: May 24, 2023

(87) PCT Pub. No.: WO2022/151153
PCT Pub. Date: Jul. 21, 2022

(65) Prior Publication Data
US 2024/0015798 A1      Jan. 11, 2024

(51) Int. Cl.
*H04W 74/0833* (2024.01)
*H04W 48/18* (2009.01)
*H04W 74/0836* (2024.01)

(52) U.S. Cl.
CPC ....... *H04W 74/0833* (2013.01); *H04W 48/18* (2013.01); *H04W 74/0836* (2024.01)

(58) Field of Classification Search
None
See application file for complete search history.

(56) References Cited

U.S. PATENT DOCUMENTS

| | | | | |
|---|---|---|---|---|
| 12,402,173 | B2 * | 8/2025 | Fu | H04W 74/0833 |
| 2019/0174536 | A1 * | 6/2019 | Han | H04W 74/0833 |

(Continued)

FOREIGN PATENT DOCUMENTS

| | | |
|---|---|---|
| CN | 106572516 A | 4/2017 |
| CN | 111448841 A | 7/2020 |

(Continued)

OTHER PUBLICATIONS

Supplementary European Search Report—EP21918362—Search Authority—The Hague—Aug. 28, 2024.

(Continued)

*Primary Examiner* — Faiyazkhan Ghafoerkhan
(74) *Attorney, Agent, or Firm* — Loza & Loza, LLP

(57) ABSTRACT

Aspects of the disclosure relate to random access procedures. An apparatus (e.g., a user equipment) may identify one or more network slices based on at least one of an access category of the apparatus, an identifier of the one or more network slices, or an index value of the one or more network slices. The apparatus may select a random access channel (RACH) configuration from a set of RACH configurations based on at least one of an access identity of the apparatus or the identified one or more network slices. The apparatus may transmit a random access message based on the RACH configuration.

28 Claims, 18 Drawing Sheets

(56)          References Cited

U.S. PATENT DOCUMENTS

| | | | |
|---|---|---|---|
| 2019/0174561 A1 | 6/2019 | Sivavakeesar | |
| 2020/0367145 A1* | 11/2020 | Zhang | H04W 48/18 |
| 2022/0353804 A1* | 11/2022 | Fu | H04W 74/0841 |
| 2023/0040079 A1* | 2/2023 | Qu | H04W 24/02 |
| 2023/0092926 A1* | 3/2023 | Fu | H04W 74/0833 |
| 2023/0094982 A1 | 3/2023 | Jiang | |
| 2023/0209521 A1* | 6/2023 | Fu | H04W 76/10 |
| | | | 370/329 |
| 2024/0015798 A1* | 1/2024 | Cheng | H04W 74/0833 |
| 2024/0064817 A1* | 2/2024 | Löhr | H04W 74/006 |

FOREIGN PATENT DOCUMENTS

| | | |
|---|---|---|
| CN | 111557119 A | 8/2020 |
| CN | 111955031 A | 11/2020 |
| EP | 3509355 A1 | 7/2019 |
| EP | 4229972 A1 | 8/2023 |
| WO | 2018142200 A1 | 8/2018 |
| WO | 2022079014 A1 | 4/2022 |

OTHER PUBLICATIONS

International Search Report and Written Opinion—PCT/CN2021/071765—ISA/EPO—Sep. 28, 2021.

* cited by examiner

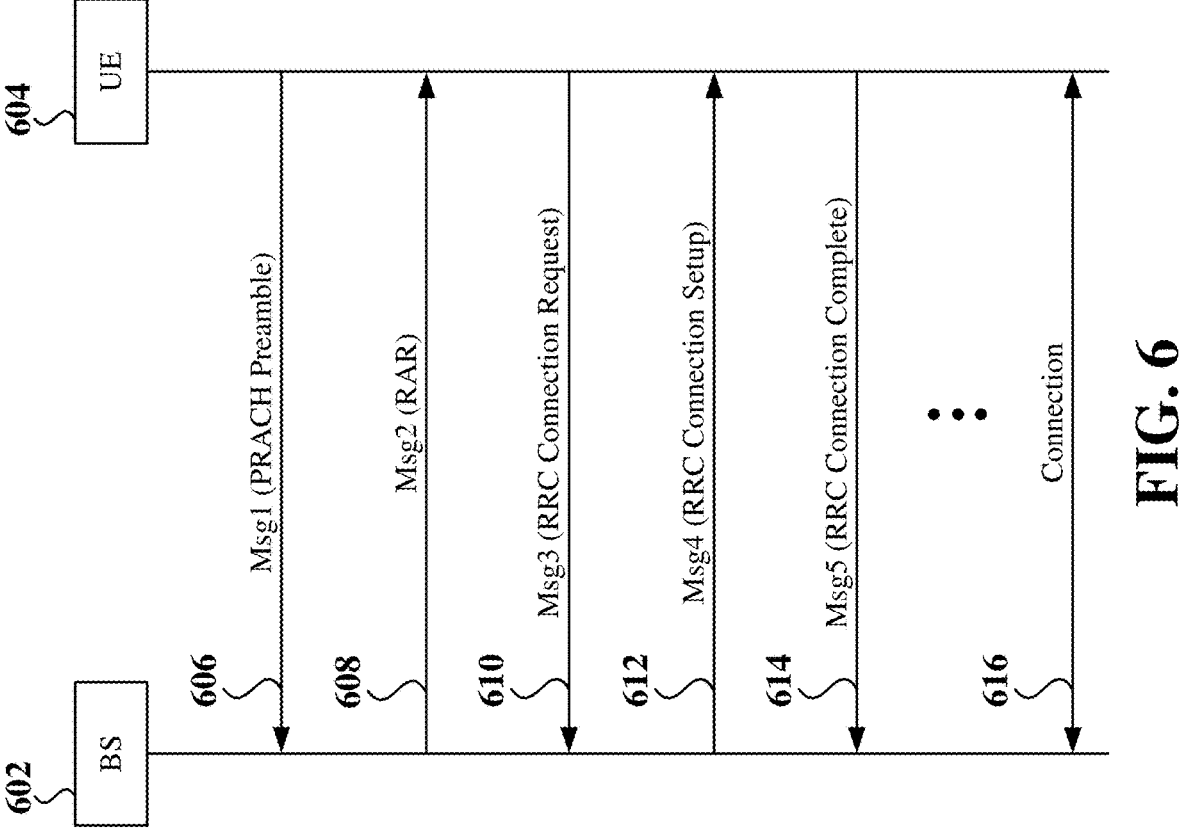
FIG. 6

| Access Category | Type of Access Attempt |
|---|---|
| 0 | Mobile originated signaling resulting from paging |
| 1 | All except for Emergency |
| 2 | Emergency |
| 3 | Mobile originated signaling resulting from other than paging |
| 4 | Multimedia Telephony Service (MMTel) voice |
| 5 | Multimedia Telephony Service (MMTel) video |
| 6 | Short message service |
| 7 | Mobile operator data that do not belong to any other Access Categories |
| 8-31 | Reserved standardized Access Categories. |
| 32-63 | Based on operator classification |

FIG. 8

| Access Identity | UE Configuration |
| --- | --- |
| 0 | UE is not configured with any parameters from this table |
| 1 | UE is configured for multimedia priority service (MPS) |
| 2 | UE is configured for mission critical service (MCS) |
| ... | ... |
| P | Reserved or Access Class |

Figure 12:
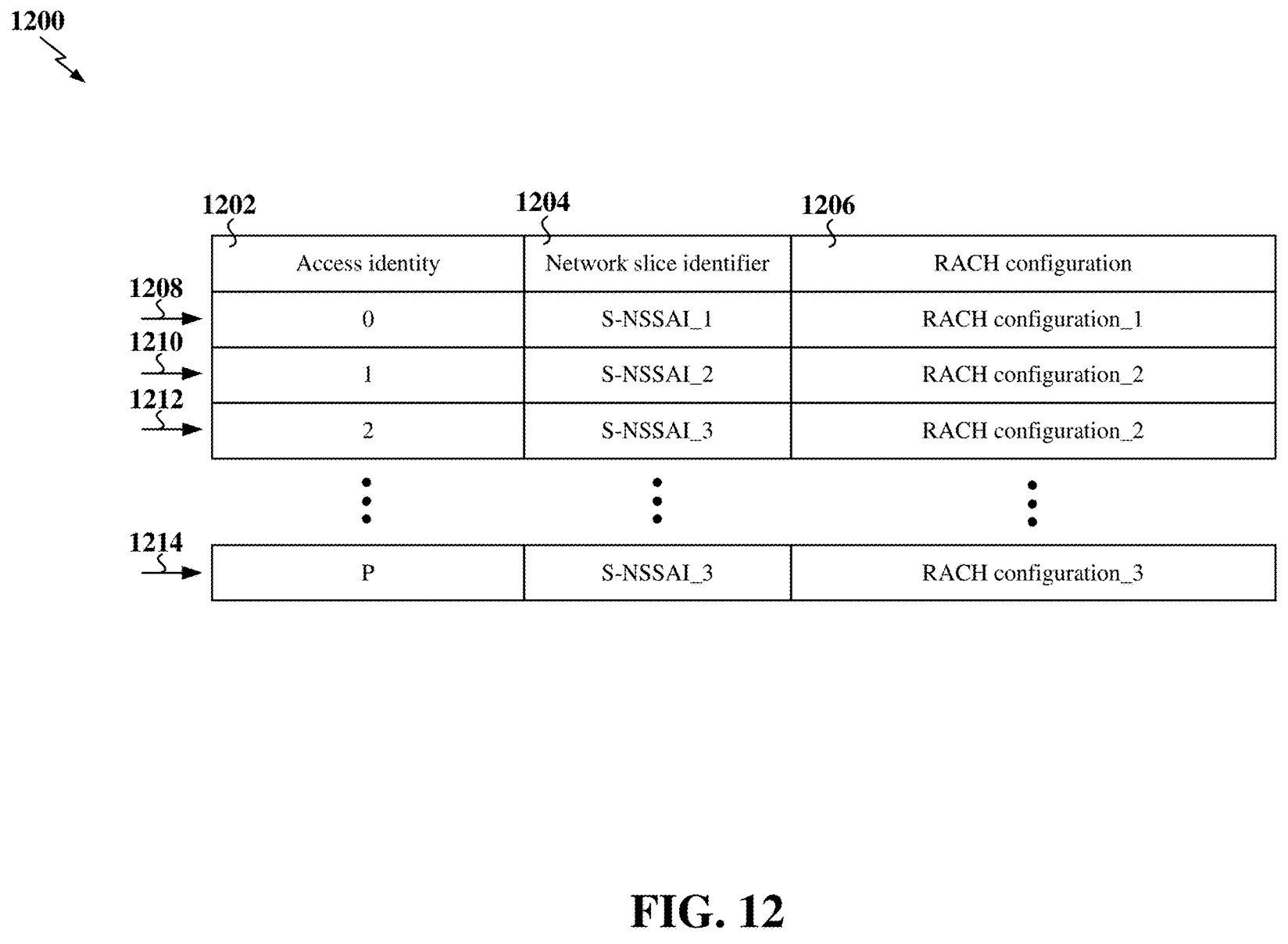

| Access identity | Network slice identifier | RACH configuration |
|:---:|:---:|:---:|
| 0 | S-NSSAI_1 | RACH configuration_1 |
| 1 | S-NSSAI_2 | RACH configuration_2 |
| 2 | S-NSSAI_3 | RACH configuration_2 |
| ⋯ | ⋯ | ⋯ |
| P | S-NSSAI_3 | RACH configuration_3 |

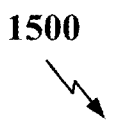

1502

Identify one or more network slices based on at least one of an access category of the UE, an identifier of the one or more network slices, or an index value of the one or more network slices

1504

Select a random access channel (RACH) configuration from a set of RACH configurations based on at least one of an access identity of the UE or the identified one or more network slices

1506

Transmit a random access message based on the RACH configuration

FIG. 15

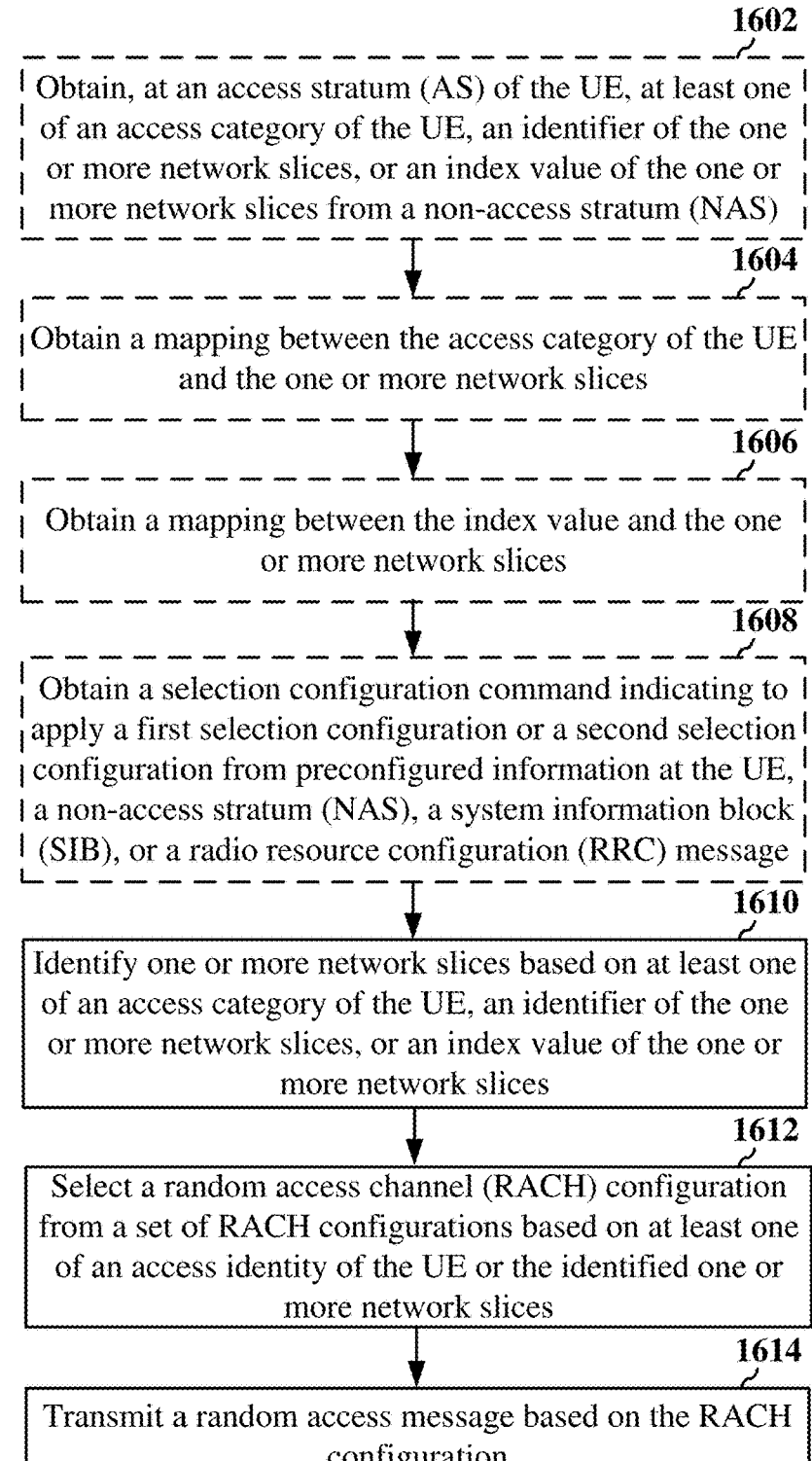

1600

1602

Obtain, at an access stratum (AS) of the UE, at least one of an access category of the UE, an identifier of the one or more network slices, or an index value of the one or more network slices from a non-access stratum (NAS)

1604

Obtain a mapping between the access category of the UE and the one or more network slices

1606

Obtain a mapping between the index value and the one or more network slices

1608

Obtain a selection configuration command indicating to apply a first selection configuration or a second selection configuration from preconfigured information at the UE, a non-access stratum (NAS), a system information block (SIB), or a radio resource configuration (RRC) message

1610

Identify one or more network slices based on at least one of an access category of the UE, an identifier of the one or more network slices, or an index value of the one or more network slices

1612

Select a random access channel (RACH) configuration from a set of RACH configurations based on at least one of an access identity of the UE or the identified one or more network slices

1614

Transmit a random access message based on the RACH configuration

1802

Transmit at least one configuration message to enable a UE to identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices

1804

Receive a random access message based on the RACH configuration

FIG. 18

RANDOM ACCESS CHANNEL PARAMETER PRIORITIZATION WITH NETWORK SLICE DIFFERENTIATION AND ACCESS IDENTITY DIFFERENTIATION

CROSS-REFERENCE TO RELATED APPLICATION(S)

This application is the U.S. national stage of PCT patent application number PCT/CN2021/071765 filed on Jan. 14, 2021, the entire content of which is incorporated herein by reference as if fully set forth below in its entirety and for all applicable purposes.

TECHNICAL FIELD

The technology discussed below relates generally to wireless communication and, more particularly, to random access channel parameter prioritization with network slice differentiation and access identity differentiation.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A UE may initiate a random access procedure to initially gain access to a cell. If the random access procedure is successful, the UE may connect to the cell for subsequent scheduling by the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method of wireless communication for a user equipment (UE) may include identifying one or more network slices based on at least one of an access category of the UE, an identifier of the one or more network slices, or an index value of the one or more network slices, selecting a random access channel (RACH) configuration from a set of RACH configurations based on at least one of an access identity of the UE or the identified one or more network slices, and transmitting a random access message based on the RACH configuration.

In some examples, a UE may include a transceiver, a memory, and a processor communicatively coupled to the transceiver and the memory. The processor and the memory may be configured to identify one or more network slices based on at least one of an access category of the UE, an identifier of the one or more network slices, or an index value of the one or more network slices, select a random access channel (RACH) configuration from a set of RACH configurations based on at least one of an access identity of the UE or the identified one or more network slices, and transmit a random access message based on the RACH configuration.

In some examples, a UE may include means for identifying one or more network slices based on at least one of an access category of the UE, an identifier of the one or more network slices, or an index value of the one or more network slices, means for selecting a random access channel (RACH) configuration from a set of RACH configurations based on at least one of an access identity of the UE or the identified one or more network slices, and means for transmitting a random access message based on the RACH configuration.

In some examples, an article of manufacture for use by a UE includes a computer-readable medium having stored therein instructions executable by one or more processors of the UE to identify one or more network slices based on at least one of an access category of the UE, an identifier of the one or more network slices, or an index value of the one or more network slices, select a random access channel (RACH) configuration from a set of RACH configurations based on at least one of an access identity of the UE or the identified one or more network slices, and transmit a random access message based on the RACH configuration.

In some examples, a method for wireless communication for a base station may include transmitting at least one configuration message to enable a user equipment to: identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices; and receiving a random access message based on the RACH configuration.

In some examples, a base station may include a transceiver, a memory, and a processor communicatively coupled to the transceiver and the memory. The processor and the memory may be configured to transmit at least one configuration message to enable a user equipment to: identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices; and receive a random access message based on the RACH configuration.

In some examples, a base station may include means for transmitting at least one configuration message to enable a user equipment to: identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices; and receiving a random access message based on the RACH configuration.

In some examples, an article of manufacture for use by a base station includes a computer-readable medium having stored therein instructions executable by one or more processors of the base station to transmit at least one configuration message to enable a user equipment to: identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices; and receive a random access message based on the RACH configuration.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 6 is a signaling diagram illustrating an example of signaling for a contention-based random access channel (RACH) procedure in a wireless communication system including a base station (BS) and a user equipment (UE).

FIG. 8 illustrates a table listing example access categories for various types of network access attempts of a UE.

FIG. 12 illustrates a mapping table indicating a mapping of access identities of a UE and/or network slice identifiers to RACH configurations in accordance with various aspects of the disclosure.

FIG. 15 is a flow chart of a method of wireless communication in accordance with various aspects of the disclosure.

FIG. 16 is a flow chart of a method of wireless communication in accordance with various aspects of the disclosure.

FIG. 18 is a flow chart of a method of wireless communication in accordance with various aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
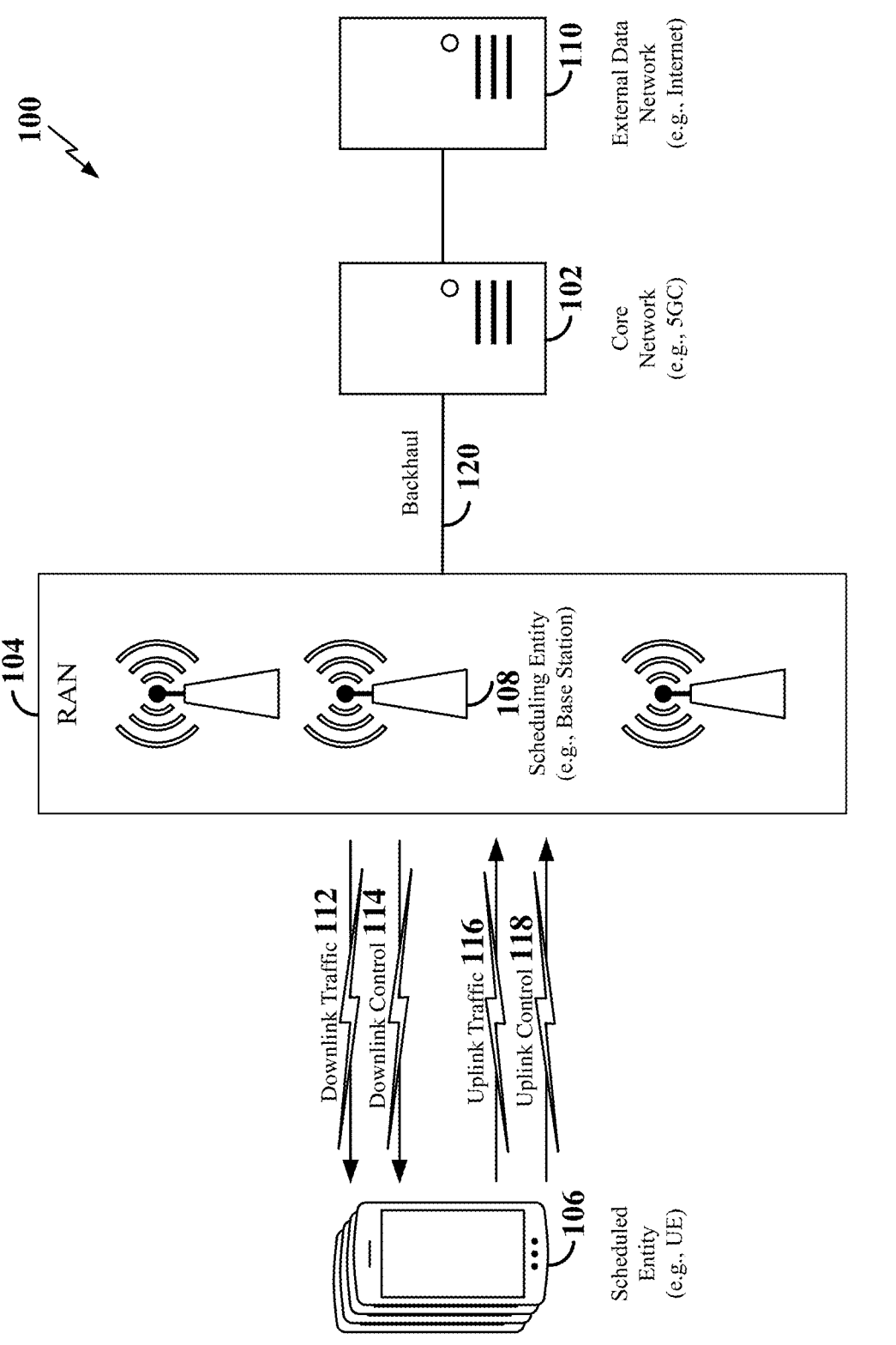
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
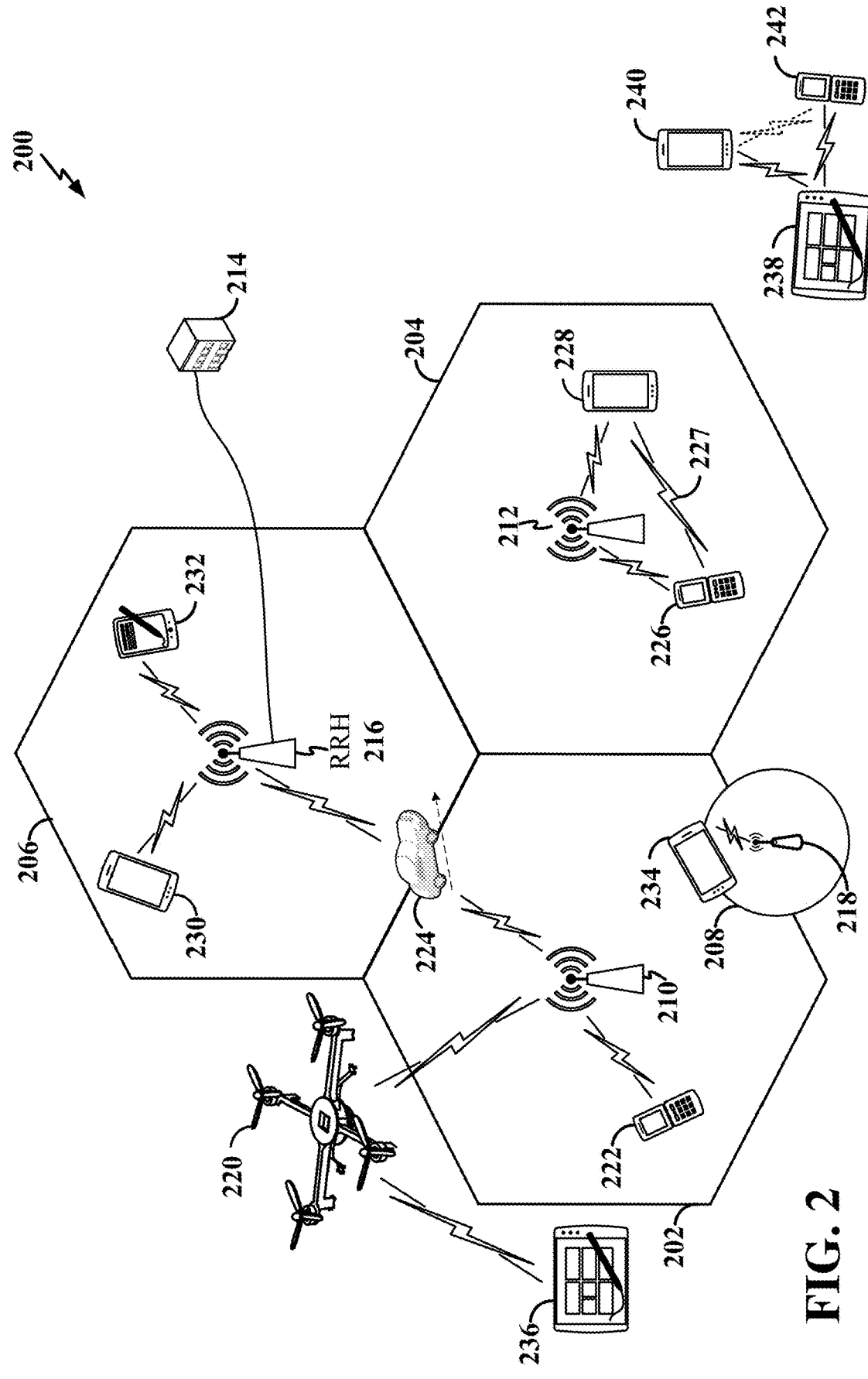
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
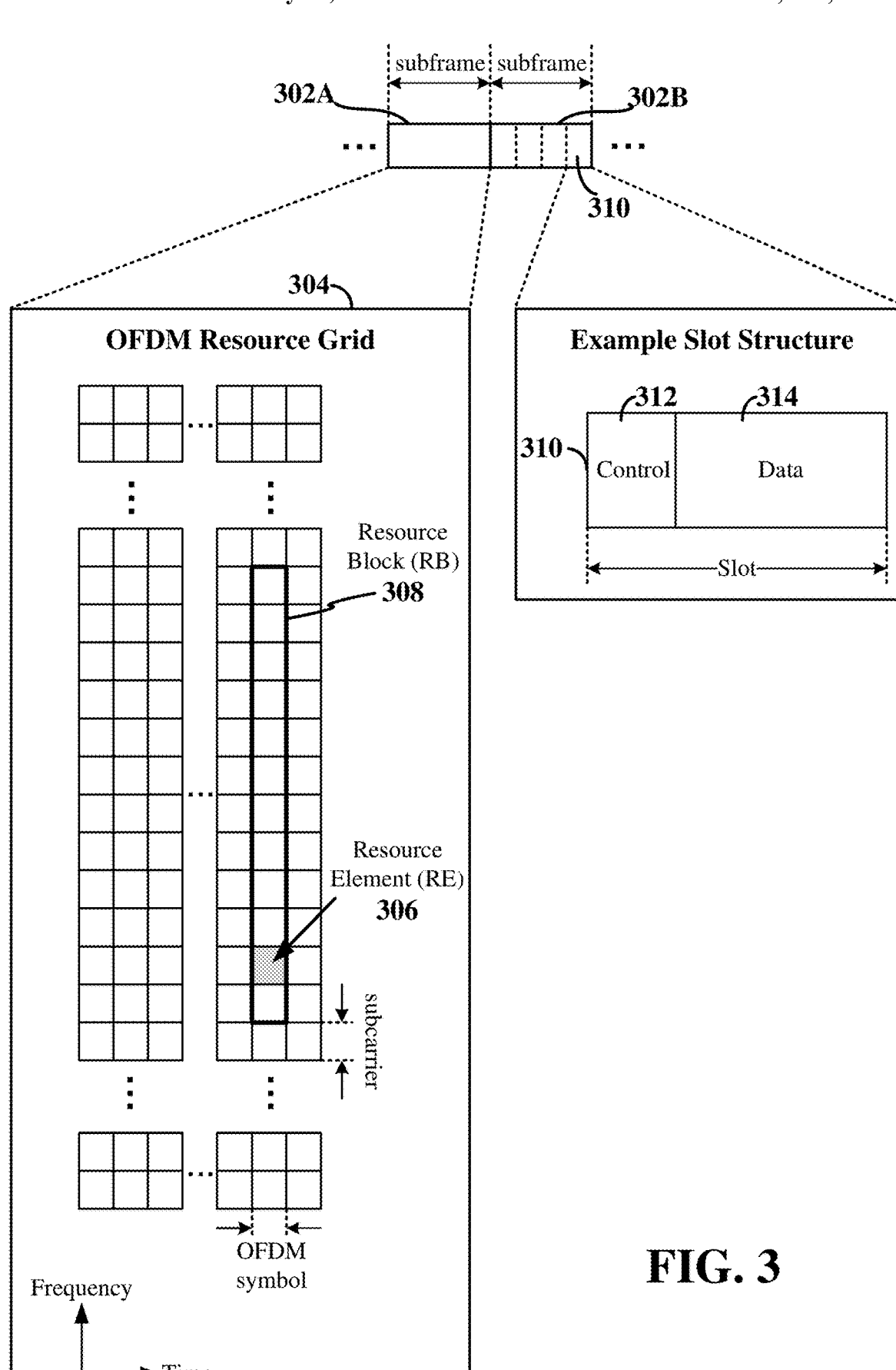
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH, and/or a physical downlink control channel (PDCCH), etc., to one or more scheduled entities. The transmitting device may further allocate one or more REs 306 to carry other DL signals, such as a DMRS, a phase-tracking reference signal (PT-RS), a channel state information-reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The SI may be subdivided into three sets referred to as minimum SI (MSI), remaining MSI (RMSI), and other SI (OSI). The PBCH may carry the MSI and some of the RMSI. For example, the PBCH may carry a master information block (MIB) that includes various types of system information, along with parameters for decoding a system information block (SIB). In some examples, the MIB may configure CORESET0.

The RMSI may be carried by, for example, a SystemInformationType1 (SIB1). A base station may transmit SIB1 (and, hence, RMSI) on a PDSCH. The CORESET0 contains the scheduling information for the PDSCH carrying the SIB1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figures 4A, 4B:
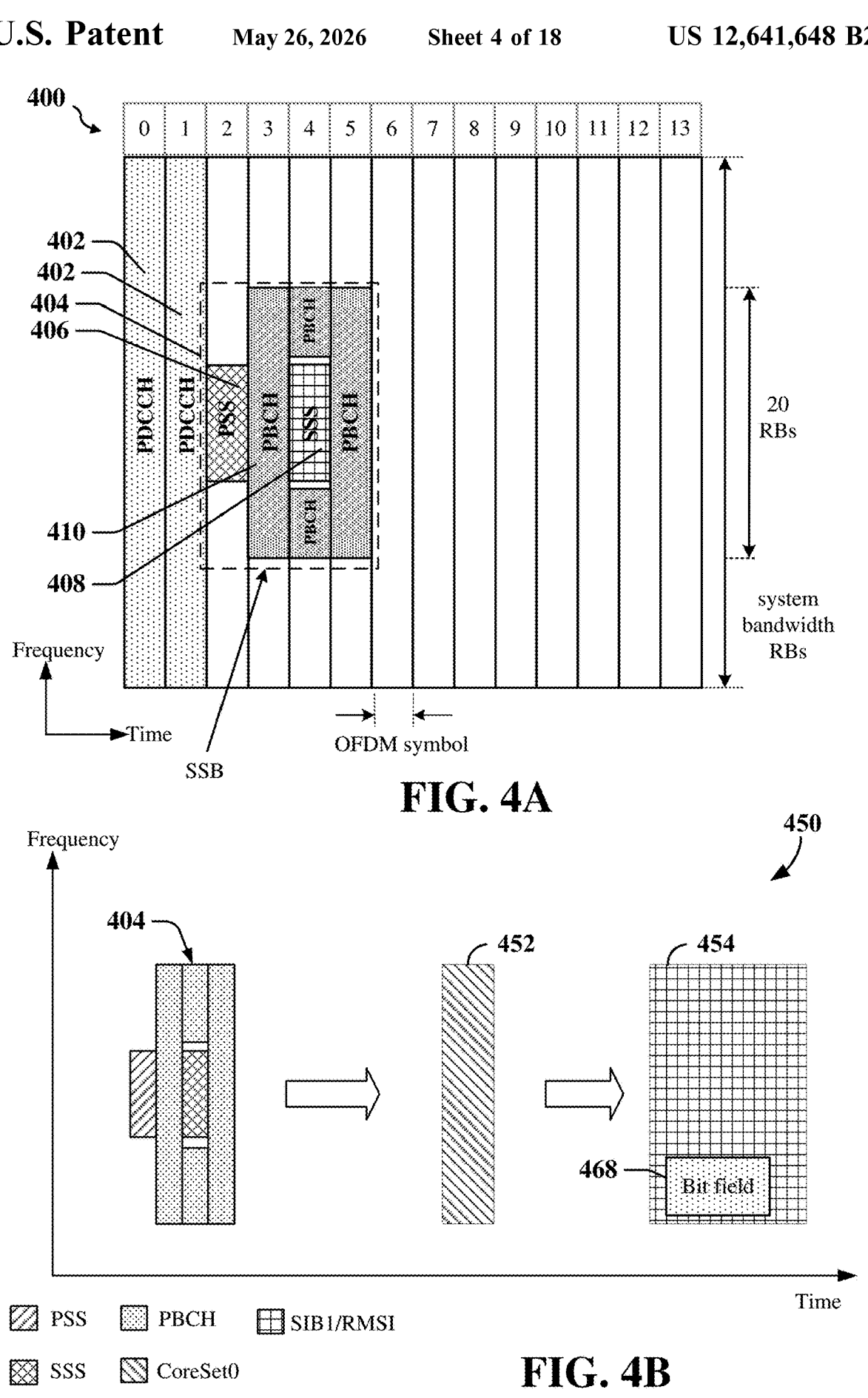
FIG. 4A is a diagram illustrating an example of a frame structure of synchronization signals for use in a wireless communication network according to some aspects.
FIG. 4B is a diagram illustrating an example of a portion of a frame or subframe structure with various channels and associated messages for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within one or more control channel elements (CCEs), with each CCE including nine RE groups (REGs), and each REG including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., SSB 404. The MIB provides a number of RBs in the system bandwidth and a system frame number (SFN).

FIG. 4B is a diagram illustrating various broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes SSB 404 illustrated in FIG. 4A. It is noted that the PBCH in SSB 404 includes the MIB carrying various system information (SI) including, for example, a cell barred indication, the subcarrier spacing, the system frame number, and scheduling information for a CORESET0 452. For example, the PBCH in SSB 404 may include scheduling information indicating time-frequency resources allocated for the CORESET0 452. In some examples, the CORESET0 452 may be transmitted within the first four symbols (e.g., within a control region) of a slot. In addition, the CORESET0 452 carries a PDCCH with DCI that contains scheduling information for scheduling the SIB1 454. The SIB1 454 is carried within a physical downlink shared channel (PDSCH) within a data region of a slot. In addition, the SIB1 454 may be referred to as RMSI and includes, for example, a set of radio resource parameters providing network identification and configuration. For example, the set of radio resource parameters may include a bandwidth (e.g., number of BWPs) on which a UE may communicate with a base station.

FIG. 4B also illustrates that the RMSI of the SIB1 message 454 may also include a bit field 468. The time/frequency location of this bit field 468 is merely exemplary to show that this bit field 468 utilizes some of the time and frequency resources of the SIB1 message 454.

The MIB in the PBCH may include system information (SI), along with parameters for decoding a SIB (e.g., SIB1). Examples of SI transmitted in the MIB may include, but are not limited to, a subcarrier spacing, system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a BS (e.g., the PSS of a cell of the BS) of the RAM. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 200 of FIG. 2). In some examples, SIB2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
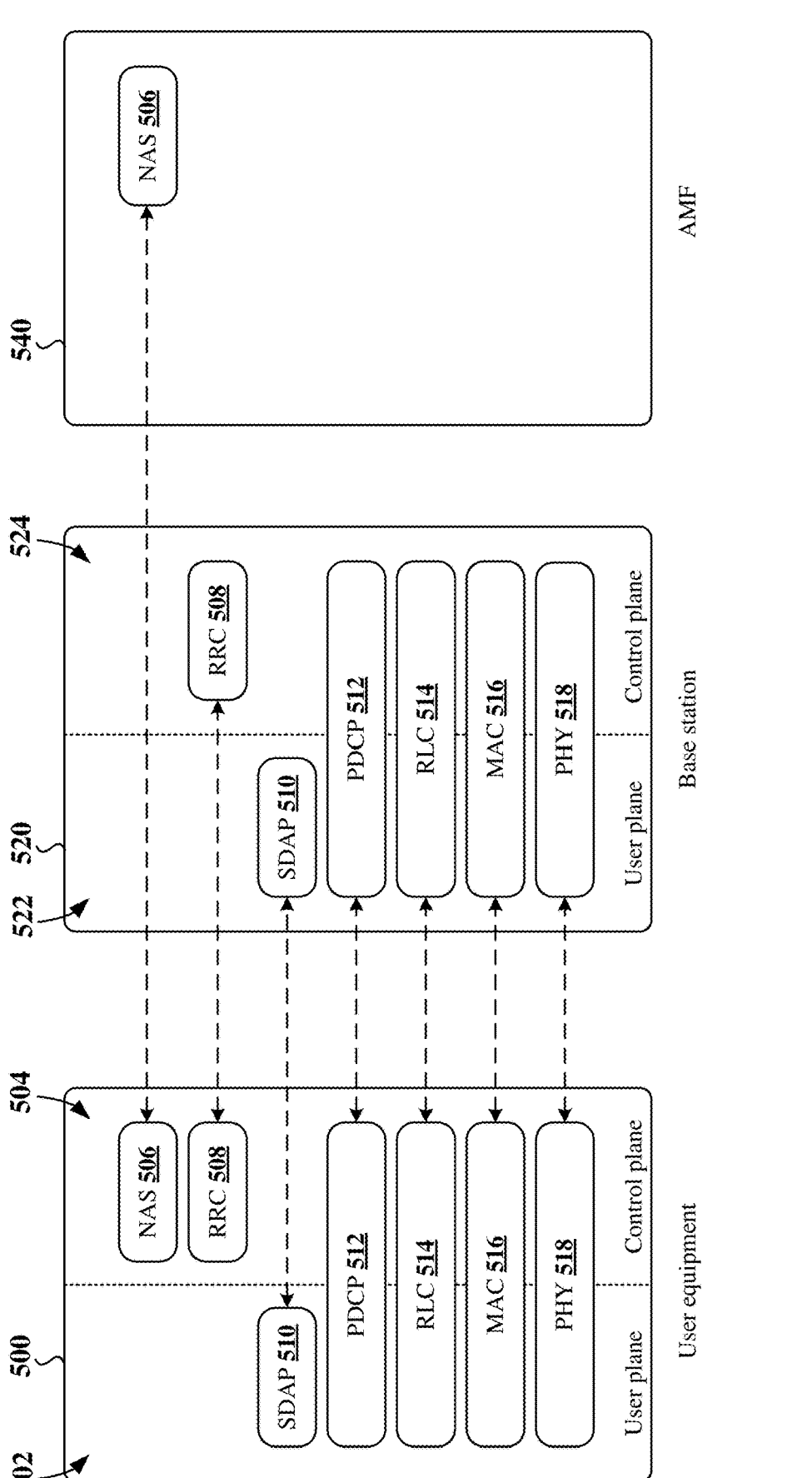
FIG. 5 illustrates an exemplary radio access network (RAN) protocol architecture.

FIG. 5 illustrates an exemplary RAN protocol architecture. As shown in FIG. 5, the user equipment 500 may include a user plane 502 and a control plane 504, and the base station 520 may include a user plane 522 and a control plane 524. The non-access stratum (NAS) protocol entities 506 terminate in the UE 500 and the AMF 540, and may be used for core network related functions and signaling including registration, authentication, location update, and session management. The radio resource control (RRC) protocol entities 508 terminate at the UE 500 and the base station 520. The service data application protocol (SDAP) protocol entities 510 terminate in the UE 500 and the base station 520, and may be responsible for mapping QoS bearers to radio bearers according to their quality of service requirements. The packet data convergence protocol (PDCP) protocol entities 512 terminate in the UE 500 and the base station 520, and may perform IP header compression, ciphering, and integrity protection. The PDCP protocol entities 512 may also handle retransmissions, in-sequence delivery, and duplicate removal in case of handover. The radio-link layer (RLC) protocol entities 514 terminate in the UE 500 and the base station 520, and may be responsible for segmentation and retransmission handling. The RLC protocol entities 514 may provide services to the PDCP (e.g., the PDCP protocol entities 512) in the form of RLC channels. The medium-access control (MAC) protocol entities 516 terminate in the UE 500 and the base station 520, and may handle multiplexing of logical channels, hybrid-ARQ retransmissions, scheduling, and scheduling-related functions. The scheduling functionality is located in the base station 520 for both uplink and downlink. The MAC protocol entities 516 provide services to the RLC (e.g., the RLC protocol entities 514) in the form of logical channels. The physical layer (PHY) protocol entities 518 terminate in the UE 500 and the base station 520, and may handle coding/decoding, modulation/demodulation, multi-antenna mapping, and other physical-layer functions. The PHY protocol entities 518 offer services to the MAC layer (e.g., the MAC protocol entities 516) in the form of transport channels.

FIG. 6 is a signaling diagram 600 illustrating an example of signaling for a contention-based RACH procedure in a wireless communication system including a base station (BS) 602 and a UE 604. In some examples, the base station 602 may correspond to any of the base stations or scheduling entities shown in any of FIGS. 1, 2, 5, 7, 13, and 17. In some examples, the UE 604 may correspond to any of the UEs or scheduled entities shown in any of FIGS. 1, 2, 5, 7, 13 and 14.

At step 606 of FIG. 6, the UE 604 transmit a message 1 (Msg1) of the RACH procedure to the BS 602. In some examples, the Msg1 is a PRACH preamble. RACH Msg1 may be referred to as PRACH. As mentioned above, the UE 604 may transmit the PRACH preamble on resources specified by a RACH configuration included in SIB2.

At step 608, the BS 602 responds to the PRACH preamble with a message 2 (Msg2) of the RACH procedure. The Msg 2 may be referred to as a random access response (RAR). In some examples, the BS 602 transmits a DCI on a PDCCH, where the DCI schedules a PDSCH (e.g., the DCI specifies the resources for the PDSCH transmission). The BS 602 then transmits the PDSCH which includes the RAR data such as, for example, an UL grant for the UE to transmit a message 3 (Msg3) of the RACH procedure.

In some examples, the UE monitors for the Msg2 on resources specified by the RACH configuration during the RAR window specified by the RACH configuration. For example, the UE may decode the DCI carried on the PDCCH and then decode the RAR carried on the PDSCH.

At step 610, upon receiving all of the RAR information, the UE 604 transmits the Msg3 of the RACH procedure. In some examples, the Msg3 is an RRC Connection Request message.

At step 612, the BS 602 responds with a message 4 (Msg4) of the RACH procedure. In some examples, the Msg 4 is an RRC Connection Setup message.

At step 614, the UE 604 responds with a message 6 (Msg5) of the RACH procedure. In some examples, the Msg 5 is an RRC Connection Complete message.

As indicated by step 616, the BS 602 and the UE 604 ultimately establish a connection and enter an active operational phase where data may be exchanged. For example, the BS may schedule the UE for UL communication and/or DL communication as discussed herein.

A wireless communication network may support different types of services. For example, a network may carry traffic with different priorities, traffic with different latency requirements (e.g., IoT traffic versus voice-over-Interpret-protocol (VoIP) traffic, etc.), traffic with different bandwidth requirements, traffic with different throughput requirements, and so on. In some examples, these different types of services may be referred to as network slices (e.g., one "slice" of the network supports one service, another "slice" of the network supports another service, and so on). In some aspects, a slice may refer to a set of network entities that can provide a particular service for a UE. In some aspects, a slice may refer to a logical network that supports certain capabilities and that has certain characteristics.

To support different services (network slices), a network may provide appropriate functionality to handle the requirements of the different services. However, a given network might not support all types of services. Thus, a network may indicate to a UE which services are supported.

In some examples, network slices are negotiated through the use of a NAS Registration procedure. Here, different types of slices may be defined by corresponding network slice selection assistance information (NSSAI). For example, a given slice may be identified by a single NSSAI (S-NSSAI). A set of S-NSSAIs may be referred to, for convenience, simply as an NSSAI. In some examples, an S-NSSAI may include a slice/service type (SST) which may specify the features and services of the slice. In some examples, an S-NSSAI may include a slice differentiator (SD) that may, for example, distinguish slices that have the same SST. Examples of SSTs include enhanced mobile broadband (eMBB), ultra-reliable low-latency communication (URLLC), and massive IoT (MIoT). Other types of SSTs may be defined as well.

Figure 7:
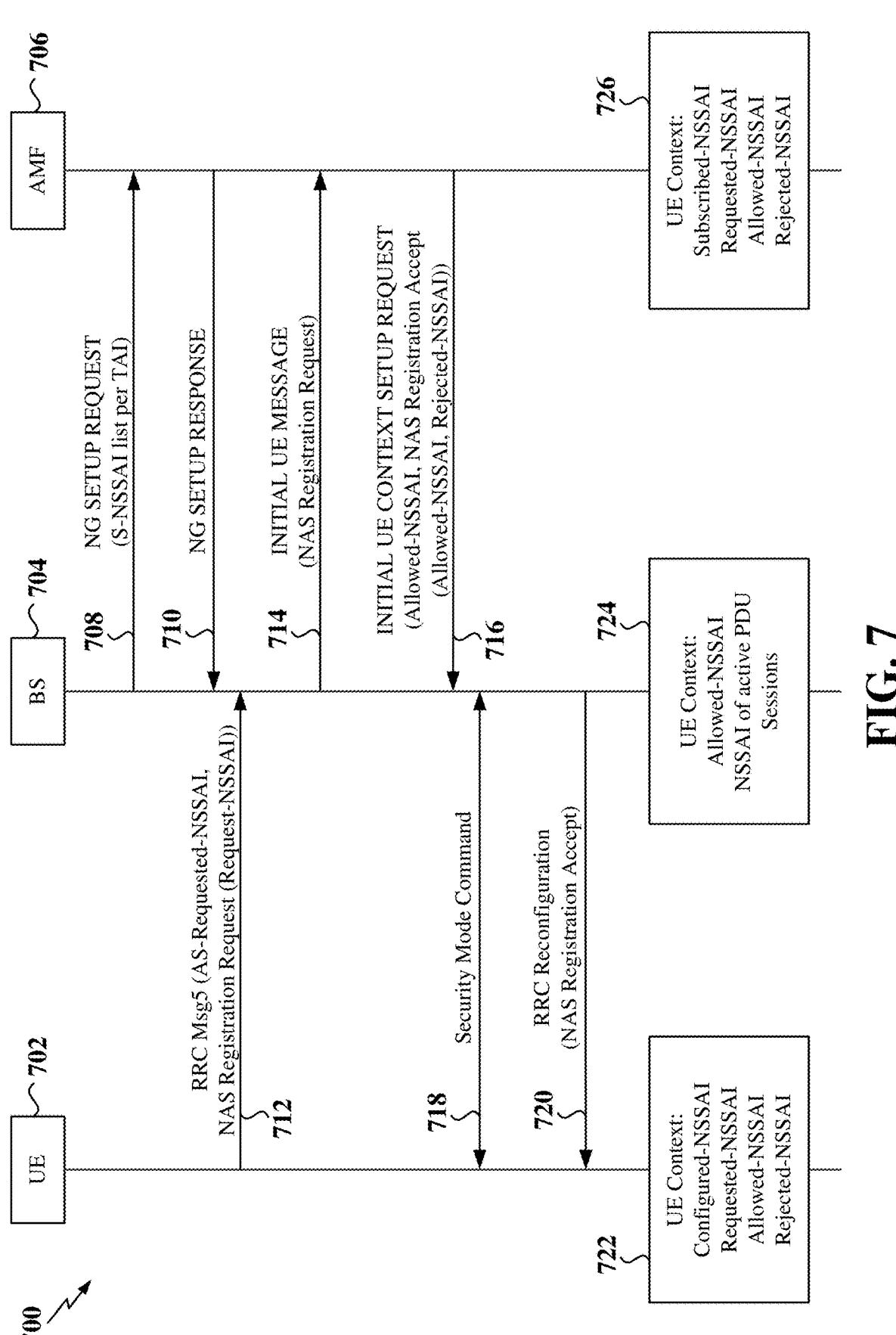
FIG. 7 is a signaling diagram illustrating an example of non-access stratum (NAS) related signaling in a wireless communication system including a UE, a BS, and an access and mobility management function (AMF).

FIG. 7 is a signaling diagram 700 illustrating an example of NAS-related signaling in a wireless communication system including a UE 702, a base station (BS) 704 such as a gNB, and an access and mobility management function (AMF) 706. In some examples, the UE 702 may correspond to any of the UEs or scheduled entities shown in any of FIGS. 1, 2, 5, 6, 13 and 14. In some examples, the BS 704 may correspond to any of the base stations or scheduling entities shown in any of FIGS. 1, 2, 5, 6, 13, and 17.

At step 708 of FIG. 7, the BS 704 transmits a 5G Core Network Next Generation (NG) Setup Request message to the AMF 706. This message may indicate each single NSSAI list per tracking area identifier (TAI). In some examples, network slice support may be uniform within a given tracking area.

At step 710, the AMF 706 transmits an NG Setup Response message to the BS 704 in response to the NG Setup Request message.

At step 712, as part of a RACH procedure, the UE 702 may transmit an RRC Msg5 to the BS 704. In some examples, Msg5 may include a NAS Registration Request. This message may include an indication of an NSSAI requested by an access stratum (AS) layer of the UE 702. In some examples, the UE 702 may transmit a NAS Registration Request message. This message may include an indication of a requested NSSAI. At step 714, the BS 704 transmits an Initial UE message to the AMF 706. This message may include an indication of the NSSAI requested by the UE 702.

At step 716, the AMF 706 transmits an Initial UE Context Setup Request message to the BS 704. This message indicates the NSSAI allowed by the network and the NSSAI rejected by the network. In some examples, the allowed NSSAI may include the minimal common set of the Requested NSSAI (or default S-NSSAIs if no valid S-NS-SAIs are requested), the Subscribed NSSAI, and the current TAI supported NSSAI.

At step 718, the UE 702 and the BS 704 exchange Security Mode Command information. At step 720, the BS 704 transmits an RRC Reconfiguration message accepting the NAS registration to the UE 702.

As indicated by block 722, the UE context at the UE 702 indicates the NSSAI configured by the network, the NSSAI requested by the UE, the NSSAI allowed by the network, and the NSSAI rejected by the network. As indicated by block 724, the UE context at the BS 704 indicates the NSSAI allowed by the network and the NSSAI of all active protocol data unit (PDU) sessions. As indicated by block 726, the UE context at the AMF 706 indicates the NSSAI subscribed at the network, the NSSAI requested by the UE 702, the NSSAI allowed by the network, and the NSSAI rejected by the network.

In some examples, an AS-Requested-NSSAI in Msg5 may be used for AMF selection. This request may be a subset of NAS Requested-NSSAI due to security concerns (e.g., if Msg5 does not have security protection). In some examples, PDU Session Establishment is associated with a network slice in the Allowed-NSSAI. For example, a PDU session may be established for each S-NSSAI.

In 3GPP Rel. 15, there is no RACH resource partitioning, i.e., only a cell-specific RACH resource is allowed. RACH parameter prioritization (e.g., prioritization of a 'preamble ramping step' and a 'backoff scaling factor') was introduced in Rel-15 and can be used for prioritized RACH access in handover (HO) and beam failure reporting (BFR). RACH parameter prioritization may be used for a 4-step RACH or a 2-step RACH. RACH parameter prioritization may be used for a mission critical service (MCS) triggered RACH and a multimedia priority service (MPS) triggered RACH. However, in implementations such as 3GPP Rel. 15, all network slices share the same random access (RA) resources and cannot be differentiated by the network.

Thus, conventional RACH configuration techniques do not differentiate between services (network slices). However, it may be advantageous to use different RACH configurations for different network slices and/or different access identities of a UE.

The UEs described herein may support a network slice-aware RACH feature. Two examples of a slice-aware RACH feature follow. In a first example, RACH resources may be partitioned or separated to provide a slice-specific separate RACH resource pool for a network slice or a group of network slices (also referred to as a network slice group). In some aspects, this example may provide guaranteed random access (RA) resources for their network slices. In a second example, RACH parameter prioritization may be used to prioritize RACH resources for specific network slices or a group of network slices during a random access (RA) procedure.

With the slice-aware RACH feature, the network may configure a priority of a network slice using NAS signaling, an RRC message, or a SIB. In some examples, the network may configure one or more network slices with isolated RACH resources or prioritized RACH parameters different from cell specific RACH resources and/or parameters. The network may achieve such configuration for the one or more network slices using NAS signaling, an RRC message, or a SIB. When data traffic arrives at the UE for an uplink transmission, a RACH operation may be triggered. The NAS may indicate the identity of a network slice to the access stratum (AS) at the UE, and the AS may select corresponding RACH resources/parameters for RACH access.

FIG. 8 illustrates a table 800 listing example access categories 802 for various types of network access attempts 804 of a UE. For example, a UE network connection attempt may link to a specific access category based on at least one of the types of network access attempts 804 in table 800. If a UE network connection attempt matches multiple types of network access attempts 804, then the UE may select the access category having the lowest number.

For example, with reference to row 806 in table 800, when a UE network connection attempt involves mobile originated signaling resulting from paging, the access category of the UE may be access category 0. As another example, with reference to row 808 in table 800, when a UE network connection attempt excludes an emergency access attempt, the access category of the UE may be access category 1. As yet another example, with reference to row 810 in table 800, when a UE network connection attempt includes an emergency access attempt, the access category of the UE may be access category 2.

Figure 9:
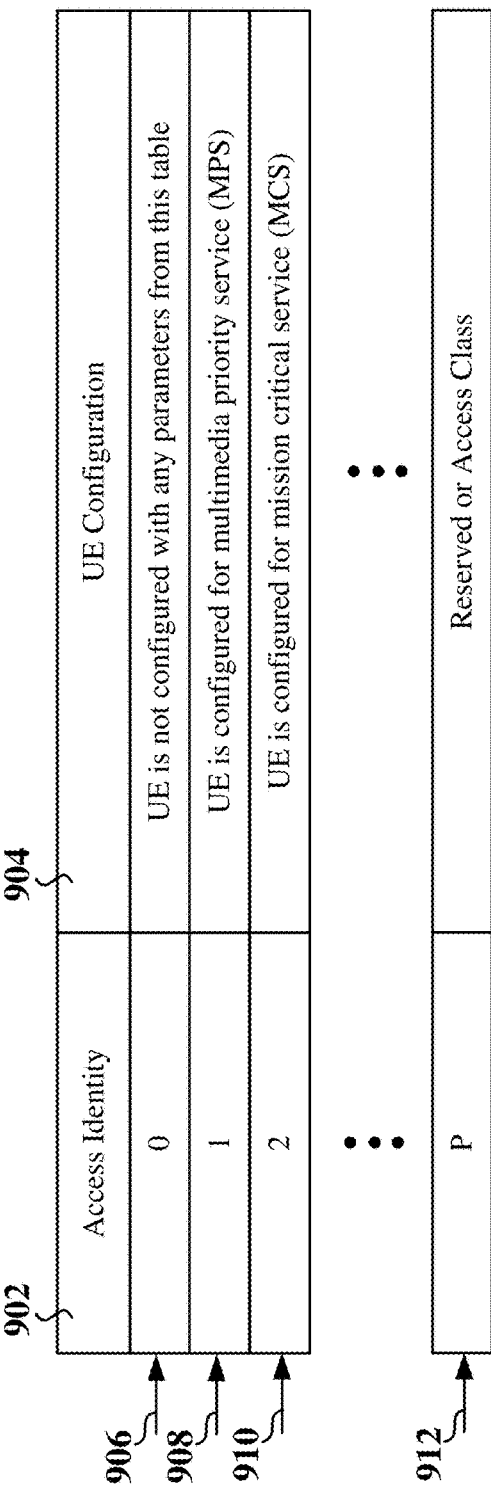
FIG. 9 illustrates a table listing example access identities for various types of UE configurations.

FIG. 9 illustrates a table 900 listing example access identities 902 for various types of UE configurations 904. For example, with reference to rows 908, 910 in table 900, a UE configured for multimedia priority service (MPS) may have an access identity 1, and a UE configured for mission critical service (MCS) may have an access identity 2. As another example, with reference to row 906 in table 900, a UE that is not configured with any parameters from table 900 may have an access identity 0. With reference to row 912 in table 900, table 900 may have additional access identities (e.g., up to access identity P, where P represents an integer greater than or equal to 3. In some examples, access identities greater than access identity 2 may be reserved or may represent a specific access class (e.g., an access class for PLMN use, security services, public utilities, emergency services, etc.). A UE may associate itself with an access identity based upon its current configuration.

Figure 10:
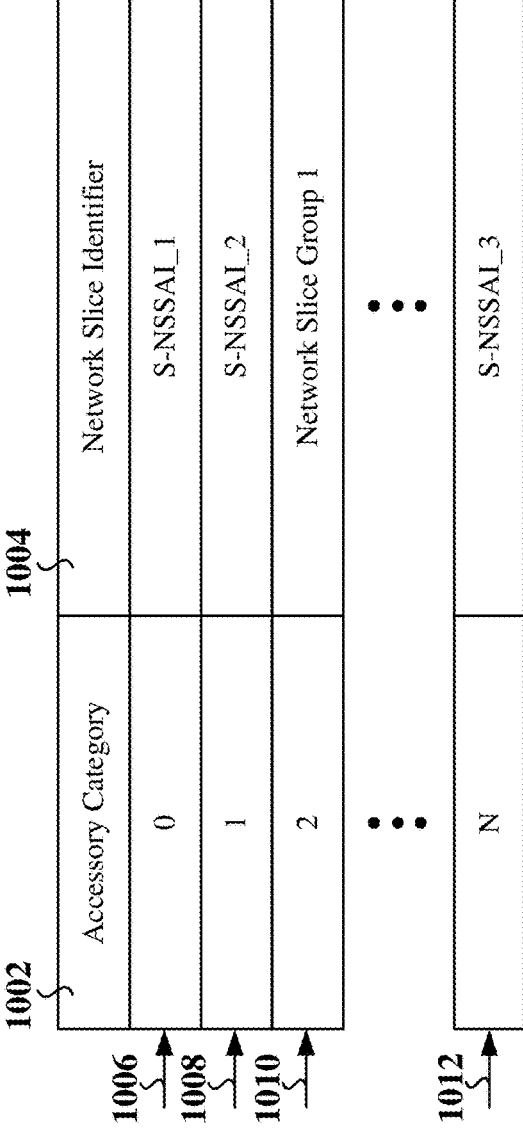
FIG. 10 illustrates a mapping table indicating a mapping of access categories to network slice identifiers in accordance with various aspects of the disclosure.

FIG. 10 illustrates a mapping table 1000 indicating a mapping of access categories to network slice identifiers in accordance with various aspects of the disclosure. In the mapping table 1000, each access category may be mapped to a single network slice or a group of network slices. For example, with reference to rows 1006, 1008, 1012 in table 1000, access category 0 may be mapped to a first network slice identified as S-NSSAI_1, access category 1 may be mapped to a second network slice identified as S-NSSAI_2, and access category N may be mapped to a third network slice identified as S-NSSAI_3. N may represent one of the access categories (e.g., in the rage of access categories 3-63) previously described with reference to FIG. 8. As another example, with reference to row 1010 in FIG. 10, access category 2 may be mapped to a network slice group (indicated as Network Slice Group 1 in FIG. 10). In some examples, the network slice group may include the network slices identified as S-NSSAI_1, S-NSSAI_2, and S-NS-SAI_3.

Figure 11:
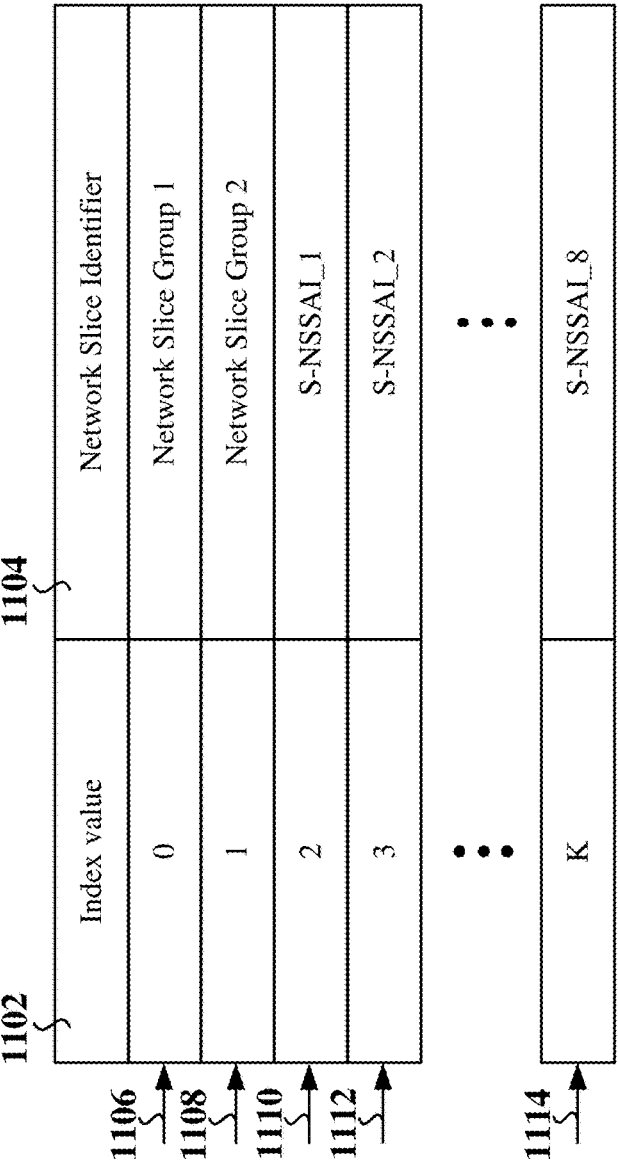
FIG. 11 illustrates a mapping table indicating a mapping of index values to network slice identifiers in accordance with various aspects of the disclosure.

FIG. 11 illustrates a mapping table 1100 indicating a mapping of index values to network slice identifiers in accordance with various aspects of the disclosure. In the mapping table 1100, each index value may be mapped to a single network slice or a group of network slices. For example, with reference to rows 1106, 1108 in table 1100, index value 0 may be mapped to a first network slice group (indicated as Network Slice Group 1 in FIG. 11), and index value 1 may be mapped to a second network slice group (indicated as Network Slice Group 2 in FIG. 11). In some examples, the first network slice group may include the network slices identified as S-NSSAI_1 and S-NSSAI_2, and the second network slice group may include the network slices identified as S-NSSAI_1, S-NSSAI_2, and S-NS-SAI_8. As another example, index value 2 may be mapped to a first network slice identified as S-NSSAI_1, index value 3 may be mapped to a second network slice identified as S-NSSAI_2, and index value K may be mapped to an eighth network slice identified as S-NSSAI_8. K may represent a positive integer (e.g., in the example of FIG. 11, K may be a positive integer greater than or equal to 4).

FIG. 12 illustrates a mapping table 1200 indicating a mapping of access identities of a UE and/or network slice identifiers to RACH configurations in accordance with various aspects of the disclosure. In the mapping table 1200, combinations of access identities and network slice identifiers are mapped to certain RACH configurations.

For example, with reference to row 1208 in table 1200, a UE with an access identity 0 and a first network slice (e.g., S-NSSAI_1) may be associated with a first RACH configuration (e.g., RACH configuration_1). With reference to row 1210 in table 1200, a UE with an access identity 1 and a second network slice (e.g., S-NSSAI_2) may be associated with a second RACH configuration (e.g., RACH configuration_2). With reference to row 1212 in table 1200, a UE with an access identity 2 and a third network slice (e.g., S-NSSAI_3) may be associated with the second RACH configuration (e.g., RACH configuration_2). With reference to row 1214 in table 1200, a UE with an access identity P (e.g., access identity 14 representing an access class for emergency services) and a third network slice (e.g., S-NS-SAI_3) may be associated with a third RACH configuration (e.g., RACH configuration_3). In some aspects of the disclosure, the RACH configurations 1206 listed in table 1200 may each include a prioritized RACH parameter set.

Figure 13:
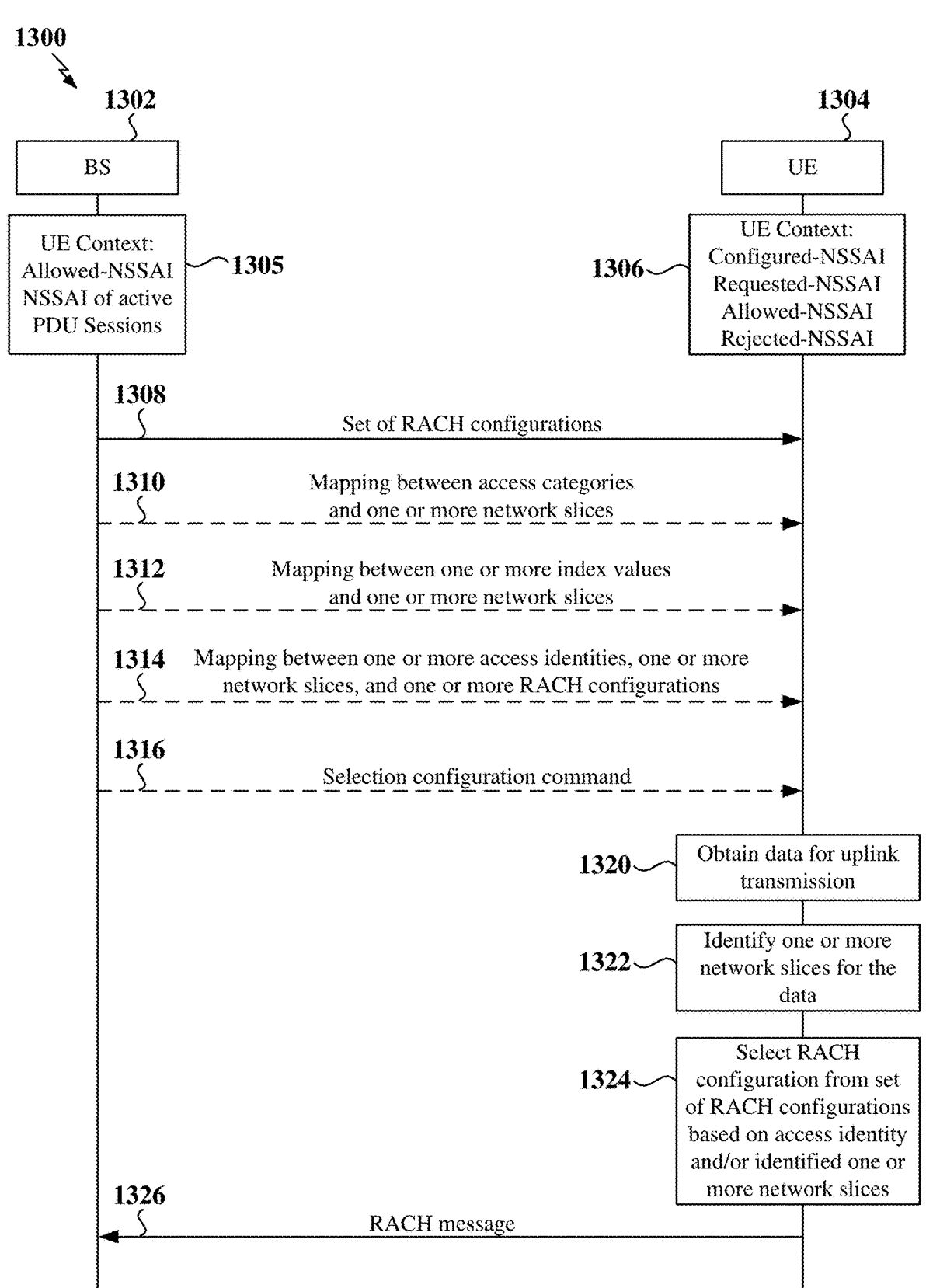
FIG. 13 illustrates a signal flow diagram including a base station (BS) and a user equipment (UE) in accordance with various aspects of the disclosure.

FIG. 13 illustrates a signal flow diagram 1300 including a base station (BS) 1302 and a user equipment (UE) 1304 in accordance with various aspects of the disclosure. As shown in block 1305, for example, the UE context at the base station 1302 may indicate the NSSAI allowed by the network and the NSSAI of all active protocol data unit (PDU) sessions. As shown in block 1306, for example, the UE context at the UE 1304 may indicate the NSSAI configured by the network, the NSSAI requested by the UE, the NSSAI allowed by the network, and the NSSAI rejected by the network. The contexts shown in blocks 1305, 1306 may be configured via NAS signaling as previously described with reference to FIG. 7.

The base station 1302 may transmit a message 1308 including a set of RACH configurations. In some examples, the set of RACH configurations may include a first RACH configuration indicating at least a first set of prioritized RACH parameters for an access identity of the UE and/or a second RACH configuration indicating at least a second set of prioritized RACH parameters for the one or more network slices.

The base station 1302 may further transmit a message 1310 including a mapping between access categories and one or more network slices. In one example implementation, the mapping in the message 1310 may include the mapping table 1000 indicating the mapping of the access categories 1002 to the network slice identifiers 1004 as previously described with reference to FIG. 10. In some examples, the message 1310 may be a NAS message (e.g., the RRC Reconfiguration (NAS Registration Accept) 720 previously described with reference to FIG. 7), a system information block (SIB), or a radio resource control (RRC) message.

The base station 1302 may further transmit a message 1312 including a mapping between one or more index values and one or more network slices. In one example implementation, the mapping in the message 1312 may include the mapping table 1100 indicating the mapping of the index values 1102 to the network slice identifiers 1104 as previously described with reference to FIG. 11. In some examples, the message 1312 may be a NAS message (e.g., the RRC Reconfiguration (NAS Registration Accept) 720 previously described with reference to FIG. 7) or a radio resource control (RRC) message.

The base station 1302 may further transmit a message 1314 including a mapping between one or more access identities, one or more network slices, and one or more RACH configurations. In one example implementation, the mapping in the message 1314 may include the mapping table 1200 indicating the mapping of access identities of a UE and/or network slice identifiers to RACH configurations as previously described with reference to FIG. 12. In some examples, the message 1314 is transmitted in a non-access stratum (NAS) message, a system information block (SIB), or a radio resource configuration (RRC) message.

The base station 1302 may further transmit a message 1316 including a selection configuration command. The selection configuration command may indicate to the UE 1304 one or more selection configurations for selecting a RACH configuration from the set of RACH configurations. In one example implementation, the selection configuration command may include a first selection configuration or a second selection configuration. For example, the first selection configuration may configure the UE 1304 to select the first RACH configuration from the set of RACH configurations when the access identity indicates that the UE is configured for a multimedia priority service (MPS) or a mission critical service (MCS). For example, the second selection configuration may configure the UE 1304 to select the second RACH configuration from the set of RACH configurations when the one or more network slices include at least one network slice for a high priority service.

In some aspects of the disclosure, the UE 1304 may obtain the selection configuration command from preconfigured information at the UE 1304, a non-access stratum (NAS), a system information block (SIB), or a radio resource configuration (RRC) message.

At 1320, the UE 1304 may obtain data for uplink transmission. In some examples, the data may arrive at an uplink buffer of the UE 1304. In these examples, the UE 1304 may obtain the data at the uplink buffer of the UE 1304. In some examples, the arrival of the data at the uplink buffer of the UE 1304 may trigger a random access (RA) procedure.

At 1322, the UE 1304 may identify one or more network slices for the data. In some aspects of the disclosure, the UE 1304 may identify the one or more network slices based on an access category of the UE. For example, the UE 1304 may obtain an access category for a RACH access at an access stratum (AS) of the UE from the non-access stratum (NAS) of the UE 1304 (e.g., the NAS 506 in the control plane 504 previously described with reference to FIG. 5). In some examples, the NAS of the UE 1304 may be configured to provide the access category to the AS of the UE 1304. In some aspects, the UE 1304 may use the access category to identify a corresponding network slice identifier in the mapping received in the message 1310. In some examples, the message 1310 may be a system information block (SIB) or a radio resource configuration (RRC) message. For example, with reference to FIG. 10, if the access category of the UE 1304 is access category 0, the UE 1304 may identify the corresponding network slice S-NSSAI_1. As another example, with reference to FIG. 10, if the access category of the UE 1304 is access category 1, the UE 1304 may identify the corresponding network slice group 1.

In some aspects of the disclosure, the UE 1304 may identify the one or more network slices based on an identifier of the one or more network slices. For example, the UE 1304 may obtain an identifier of the one or more network slices at an access stratum (AS) of the UE from the non-access stratum (NAS) of the UE 1304 (e.g., the NAS 506 in the control plane 504 previously described with reference to FIG. 5). In some examples, the NAS of the UE 1304 may be configured to provide the identifier of the one or more network slices to the AS of the UE 1304. In some aspects of the disclosure, the identifier of the one or more network slices may include single network slice selection assistance information (S-NSSAI), a slice/service type (SST), or a slice group identifier. For example, the SST may be an 8-bit value.

In some examples, the slice group identifier is mapped to one or more S-NSSAIs. For example, the mapping of the slice group identifier to the one or more S-NSSAIs may be provided to the UE 1304 from the non-access stratum (NAS) of the UE 1304 (e.g., the NAS 506 in the control plane 504 previously described with reference to FIG. 5), in a system information block (SIB), or in a radio resource control (RRC) message.

In some aspects of the disclosure, the UE 1304 may identify the one or more network slices based on an index value of the one or more network slices. For example, the UE 1304 may obtain one or more index values for a RACH access at an access stratum (AS) of the UE from the non-access stratum (NAS) of the UE 1304 (e.g., the NAS

506 in the control plane 504 previously described with reference to FIG. 5). In some examples, the NAS of the UE 1304 may be configured to provide the one or more index values to the AS of the UE 1304. In some aspects, the UE 1304 may use the one or more index values to identify corresponding one or more network slice identifiers in the mapping received in the message 1312 or in preconfigured information (e.g., preconfigured mapping information) at the UE 1304. In some aspects of the disclosure, network slice indices supported by the network may be broadcast to the UE (e.g., from the base station 1302) to avoid compromising the security of the UE 1304. For example, with reference to the mapping table 1100 in FIG. 11, if an index value provided by the NAS to the AS of the UE 1304 is index value 0, the UE 1304 may identify the corresponding network slice group 1. As another example, with reference to the mapping table 1100 in FIG. 11, if the index value of the UE 1304 is index value 2, the UE 1304 may identify the corresponding network slice S-NSSAI_1.

At 1324, the UE may select a RACH configuration from the set of RACH configurations based on the access identity of the UE 1304 and/or the identified one or more network slices of the UE 1304. In some aspects of the disclosure, the UE 1304 may select the RACH configuration from the set of RACH configurations based on a first selection configuration or a second selection configuration.

As previously described, in some examples, the first RACH configuration may indicate at least a first set of prioritized RACH parameters for the access identity of the UE 1304, and the second RACH configuration may indicate at least a second set of prioritized RACH parameters for the one or more network slices of the UE 1304. In one example, if the UE 1304 is configured to select a RACH configuration based on the first selection configuration, the access identity of the UE 1304 may control over the one or more network slices of the UE 1304 and, therefore, the UE 1304 (e.g., the access stratum (AS) of the UE 1304) may select the RACH configuration indicating prioritized RACH parameters for the MPS and/or MCS access identity (e.g., the first RACH configuration). In other words, in the case of the first selection configuration, when the access identity of the UE 1304 indicates that the UE 1304 is configured for a multimedia priority service (MPS) or a mission critical service (MCS), the UE 1304 may ignore RACH configurations indicating prioritized RACH parameters for the one or more network slices of the UE and may select the RACH configuration indicating prioritized RACH parameters for the MPS and/or MCS access identity (e.g., the first RACH configuration).

In another example, if the UE 1304 is configured to select a RACH configuration based on the second selection configuration, the one or more network slices of the UE 1304 may control over the access identity of the UE 1304 and, therefore, the UE 1304 (e.g., the access stratum (AS) of the UE 1304) may select the RACH configuration indicating prioritized RACH parameters associated with the one or more network slices of the UE 1304 (e.g., the second RACH configuration). In other words, in the case of the second selection configuration, when a RACH configuration indicating prioritized RACH parameters is available for one or more network slices of the UE 1304, the UE 1304 may ignore RACH configurations indicating prioritized RACH parameters for the access identity of the UE 1304 and may select the RACH configuration indicating prioritized RACH parameters for the one or more network slices of the UE 1304 (e.g., the second RACH configuration).

In some examples, the UE 1304 may be configured to apply the second selection configuration when the one or more network slices of the UE 1304 include at least one network slice for a high priority service. For example, the high priority service may be a URLLC service.

In some aspects of the disclosure, the UE 1304 may select a RACH configuration from the set of RACH configurations based on a mapping between one or more access identities, one or more network slices, and one or more RACH configurations. For example, the mapping may include the mapping table 1200 previously described with reference to FIG. 12. For example, with reference to the mapping table 1200 in FIG. 12, if the UE 1304 has an access identity 0 and has a first network slice (e.g., S-NSSAI_1), the UE 1304 may select the first RACH configuration (e.g., RACH configuration_1) as indicated in row 1208. In some examples, the UE 1304 may obtain the mapping (e.g., the mapping table 1200) from a non-access stratum (NAS), a system information block (SIB), or a radio resource configuration (RRC) message.

The UE 1304 may transmit a RACH message 1326 using the selected RACH configuration. For example, the RACH message may be one of the RACH messages previously described with reference to FIG. 6, such as the Msg1.

Figure 14:
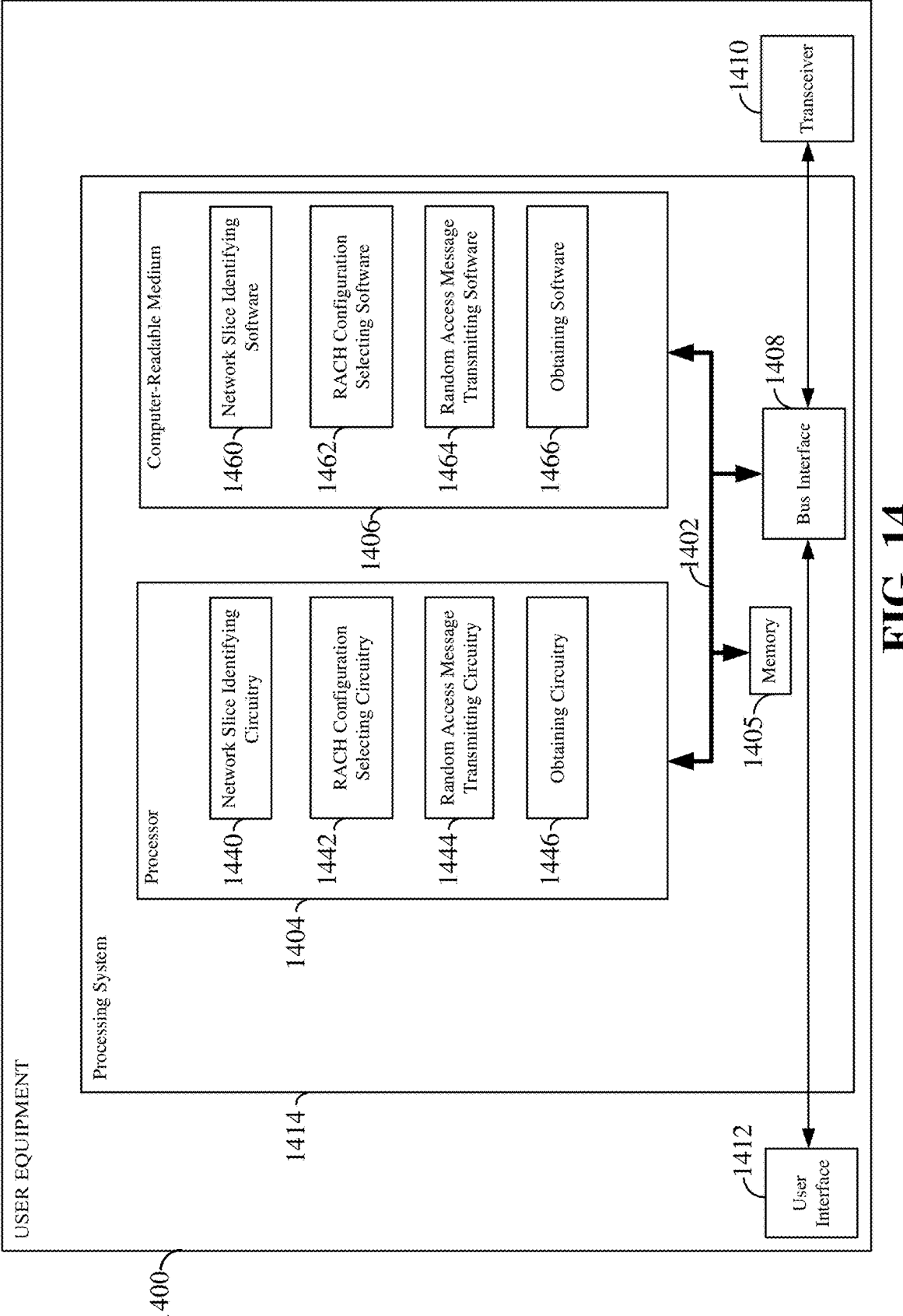
FIG. 14 is a block diagram illustrating an example of a hardware implementation for a user equipment employing a processing system according to some aspects.

FIG. 14 is a block diagram illustrating an example of a hardware implementation for a UE 1400 employing a processing system 1414. For example, the UE 1400 may be a device configured to wirelessly communicate with a base station, as discussed in any one or more of FIGS. 1-13. In some implementations, the UE 1400 may correspond to any of the UEs or scheduled entities shown in any of FIGS. 1, 2, 5-7, and 13.

In accordance with various aspects of the disclosure, an element, or any portion of an element, or any combination of elements may be implemented with the processing system 1414. The processing system 1414 may include one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in a UE 1400, may be used to implement any one or more of the processes and procedures described herein.

The processor 1404 may in some instances be implemented via a baseband or modem chip and in other implementations, the processor 1404 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410 and between the bus 1402 and an interface 1412. The transceiver 1410 provides a communication interface or means for communicating with various other apparatus over a wireless transmission medium. In some examples, the UE may include two or more transceivers 1410, each configured to communicate with a respective network type (e.g., terrestrial or non-terrestrial). The interface 1412 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1412 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1400 may be configured to perform any one or more of the operations described herein (e.g., as described above in conjunction with FIGS. 1-13 and as described below in conjunction with FIGS. 15 and 16). In some aspects of the disclosure, the processor 1404, as utilized in the UE 1400, may include circuitry configured for various functions.

In some aspects of the disclosure, the processor 1404 may include network slice identifying circuitry 1440 configured for various functions, including, for example, identifying one or more network slices based on at least one of an access category of the UE, an identifier of the one or more network slices, or an index value of the one or more network slices. For example, the network slice identifying circuitry 1440 may be configured to implement one or more of the functions described below in relation to FIG. 15, including, e.g., block 1502, and FIG. 16, including, e.g., block 1610. In some examples, the network slice identifying circuitry 1440 may include functionality for a means for identifying one or more network slices (e.g., as described in block 1502 in FIG. 15, block 1610 in FIG. 16).

In some aspects of the disclosure, the processor 1404 may include RACH configuration selecting circuitry 1442 configured for various functions, including, for example, selecting a random access channel (RACH) configuration from a set of RACH configurations based on at least one of an access identity of the UE or the identified one or more network slices. For example, the RACH configuration selecting circuitry 1442 may be configured to implement one or more of the functions described below in relation to FIG. 15, including, e.g., block 1504, and FIG. 16, including, e.g., block 1612. In some examples, the RACH configuration selecting circuitry 1442 may include functionality for a means for selecting a random access channel (RACH) configuration (e.g., as described in block 1504 in FIG. 15, block 1612 in FIG. 16).

In some aspects of the disclosure, the processor 1404 may include random access message transmitting circuitry 1444 configured for various functions, including, for example, transmitting a random access message based on the RACH configuration. For example, the random access message transmitting circuitry 1444 may be configured to implement one or more of the functions described below in relation to FIG. 15, including, e.g., block 1506, and FIG. 16, including, e.g., block 1614. In some examples, the random access message transmitting circuitry 1444 may include functionality for a means for transmitting a random access message (e.g., as described in block 1506 in FIG. 15, block 1614 in FIG. 16).

In some aspects of the disclosure, the processor 1404 may include obtaining circuitry 1446 configured for various functions, including, for example, obtaining, at an access stratum (AS) of the UE, at least one of the access category of the UE, the identifier of the one or more network slices, or the index value of the one or more network slices from a non-access stratum (NAS). The obtaining circuitry 1446 may be further configured for obtaining a mapping between the access category of the UE and the one or more network slices, wherein the one or more network slices are identified using the access category and the mapping. The obtaining circuitry 1446 may be further configured for obtaining a mapping between the index value and the one or more network slices, wherein the one or more network slices are identified using the index value and the mapping. The obtaining circuitry 1446 may be further configured for obtaining a mapping between at least one of the access identity of the UE or the identified one or more network slices, and the RACH configuration in the set of RACH configurations. The obtaining circuitry 1446 may be further configured for obtaining a selection configuration command indicating to apply the first selection configuration or the second selection configuration from preconfigured information at the UE, a non-access stratum (NAS), a system information block (SIB), or a radio resource configuration (RRC) message. For example, the obtaining circuitry 1446 may be configured to implement one or more of the functions described below in relation to FIG. 16, including, e.g., blocks 1602, 1604, 1606, 1608. In some examples, the obtaining circuitry 1446 may include functionality for a means for obtaining (e.g., as described in block 1602, 1604, 1606, 1608 in FIG. 16).

In one or more examples, the computer-readable storage medium 1406 may include network slice identifying software 1460 configured for identifying one or more network slices based on at least one of an access category of the UE, an identifier of the one or more network slices, or an index value of the one or more network slices. For example, the network slice identifying software 1460 may be configured to implement one or more of the functions described below in relation to FIG. 15, including, e.g., block 1502, and FIG. 16, including, e.g., block 1610.

In one or more examples, the computer-readable storage medium 1406 may further include RACH configuration selecting software 1462 configured for selecting a random access channel (RACH) configuration from a set of RACH configurations based on at least one of an access identity of the UE or the identified one or more network slices. For example, the RACH configuration selecting software 1462 may be configured to implement one or more of the functions described below in relation to FIG. 15, including, e.g., block 1504, and FIG. 16, including, e.g., block 1612.

In one or more examples, the computer-readable storage medium 1406 may further include random access message transmitting software 1464 configured for various functions, including, for example, transmitting a random access message based on the RACH configuration. For example, the random access message transmitting software 1464 may be configured to implement one or more of the functions described below in relation to FIG. 15, including, e.g., block 1506, and FIG. 16, including, e.g., block 1614.

In one or more examples, the computer-readable storage medium 1406 may further include obtaining software 1466 configured for obtaining, at an access stratum (AS) of the UE, at least one of the access category of the UE, the identifier of the one or more network slices, or the index value of the one or more network slices from a non-access stratum (NAS). The obtaining software 1466 may be further configured for obtaining a mapping between the access category of the UE and the one or more network slices, wherein the one or more network slices are identified using the access category and the mapping. The obtaining software 1466 may be further configured for obtaining a mapping between the index value and the one or more network slices, wherein the one or more network slices are identified using the index value and the mapping. The obtaining software 1466 may be further configured for obtaining a mapping between at least one of the access identity of the UE or the identified one or more network slices, and the RACH configuration in the set of RACH configurations. The obtaining software 1466 may be further configured for obtaining a selection configuration command indicating to apply the first selection configuration or the second selection configuration from preconfigured information at the UE, a non-access stratum (NAS), a system information block (SIB), or a radio resource configuration (RRC) message. For example, the obtaining software 1466 may be configured to implement one or more of the functions described below in relation to FIG. 16, including, e.g., blocks 1602, 1604, 1606, 1608.

FIG. 15 is a flow chart illustrating an example wireless communication method 1500 according to some aspects of the disclosure. As described herein, some or all illustrated features may be omitted in a particular implementation within the scope of the present disclosure, and some illustrated features may not be required for implementation of all embodiments. In some examples, the method 1500 may be carried out by the UE 1400 illustrated in FIG. 14. In some examples, the method 1500 may be carried out by any suitable apparatus or means for carrying out the functions or algorithm described below.

At block 1502, a UE may identify one or more network slices based on at least one of an access category of the UE, an identifier of the one or more network slices, or an index value of the one or more network slices. In some examples, the UE may obtain, at an access stratum (AS) of the UE, the access category of the UE, the identifier of the one or more network slices, and/or the index value of the one or more network slices from a non-access stratum (NAS). For example, the identifier of the one or more network slices may include single network slice selection assistance information (S-NSSAI), a slice/service type (SST), or a slice group identifier. In some examples, the UE may identify the one or more network slices based on a mapping (e.g., the mapping in mapping table 1000 in FIG. 10) between the access category of the UE and the one or more network slices. In some examples, the UE may identify the one or more network slices based on a mapping (e.g., the mapping in mapping table 1100 in FIG. 10) between the index value and the one or more network slices.

At block 1504, the UE may select a random access channel (RACH) configuration from a set of RACH configurations based on at least one of an access identity of the UE or the identified one or more network slices. In some examples, the set of RACH configurations may include at least a first RACH configuration indicating at least a first set of prioritized RACH parameters for the access identity or a second RACH configuration indicating at least a second set of prioritized RACH parameters for the one or more network slices. In some examples, the UE may select the RACH configuration from the set of RACH configurations further based on a first selection configuration or a second selection configuration.

In some examples, the UE may select the RACH configuration based on the first selection configuration by selecting the first RACH configuration from the set of RACH configurations when the access identity indicates that the UE is configured for a multimedia priority service (MPS) or a mission critical service (MCS). In some examples, the UE may select the RACH configuration based on the second selection configuration by selecting the second RACH configuration from the set of RACH configurations when the one or more network slices include at least one network slice for a high priority service.

In some examples, the UE may select the RACH configuration from the set of RACH configurations by obtaining a mapping (e.g., the mapping table 1200 in FIG. 12) between at least one of the access identity of the UE or the identified one or more network slices, and the RACH configuration in the set of RACH configurations, and selecting the RACH configuration based on the mapping. In some examples, the UE may obtain the mapping (e.g., the mapping table 1200 in FIG. 12) from a non-access stratum (NAS), a system information block (SIB), or a radio resource configuration (RRC) message. In some examples, the UE may obtain a selection configuration command (e.g., the selection configuration command in the message 1316 in FIG. 13) indicating to apply the first selection configuration or the second selection configuration from preconfigured information at the UE, a non-access stratum (NAS), a system information block (SIB), or a radio resource configuration (RRC) message.

At block 1506, the UE may transmit a random access message based on the RACH configuration.

FIG. 16 is a flow chart illustrating an example wireless communication method 1600 according to some aspects of the disclosure. As described herein, some or all illustrated features may be omitted in a particular implementation within the scope of the present disclosure, and some illustrated features may not be required for implementation of all embodiments. In some examples, the method 1600 may be carried out by the UE 1400 illustrated in FIG. 14. In some examples, the method 1600 may be carried out by any suitable apparatus or means for carrying out the functions or algorithm described below.

At block 1602, a UE may obtain, at an access stratum (AS) of the UE, at least one of an access category of the UE, an identifier of the one or more network slices, or an index value of the one or more network slices from a non-access stratum (NAS).

At block 1604, the UE may obtain a mapping (e.g., the mapping in the mapping table 1000 described with reference to FIG. 10) between the access category of the UE and the one or more network slices.

At block 1606, the UE may obtain a mapping (e.g., the mapping in the mapping table 1100 described with reference to FIG. 11) between the index value and the one or more network slices.

At block 1608, the UE may obtain a selection configuration command indicating to apply a first selection configuration or a second selection configuration from preconfigured information at the UE, a non-access stratum (NAS), a system information block (SIB), or a radio resource configuration (RRC) message. In some examples, the selection configuration command may be the selection configuration command in the message 1316 described with reference to FIG. 13.

At block 1610, a UE may identify one or more network slices based on at least one of an access category of the UE, an identifier of the one or more network slices, or an index value of the one or more network slices. In some examples, the UE may identify the one or more network slices using the access category and the mapping (e.g., the mapping in the mapping table 1000 described with reference to FIG. 10) between the access category of the UE and the one or more network slices. In some examples, the UE may identify the one or more network slices using the index value and the mapping (e.g., the mapping in the mapping table 1100 described with reference to FIG. 11) between the index value and the one or more network slices.

At block 1612, the UE may select a random access channel (RACH) configuration from a set of RACH configurations based on at least one of an access identity of the UE or the identified one or more network slices. In some examples, the set of RACH configurations may include at least a first RACH configuration indicating at least a first set of prioritized RACH parameters for the access identity or a second RACH configuration indicating at least a second set of prioritized RACH parameters for the one or more network slices. In some examples, the UE may select the RACH configuration from the set of RACH configurations further based on the first selection configuration or the second selection configuration.

In some examples, the UE may select the RACH configuration based on the first selection configuration by selecting the first RACH configuration from the set of RACH configurations when the access identity indicates that the UE is configured for a multimedia priority service (MPS) or a mission critical service (MCS). In some examples, the UE may select the RACH configuration based on the second selection configuration by selecting the second RACH configuration from the set of RACH configurations when the one or more network slices include at least one network slice for a high priority service.

In some examples, the UE may select the RACH configuration from the set of RACH configurations by obtaining a mapping (e.g., the mapping table 1200 in FIG. 12) between at least one of the access identity of the UE or the identified one or more network slices, and the RACH configuration in the set of RACH configurations, and selecting the RACH configuration based on the mapping. In some examples, the UE may obtain the mapping (e.g., the mapping table 1200 in FIG. 12) from a non-access stratum (NAS), a system information block (SIB), or a radio resource configuration (RRC) message.

At block 1614, the UE may transmit a random access message based on the RACH configuration.

Figure 17:
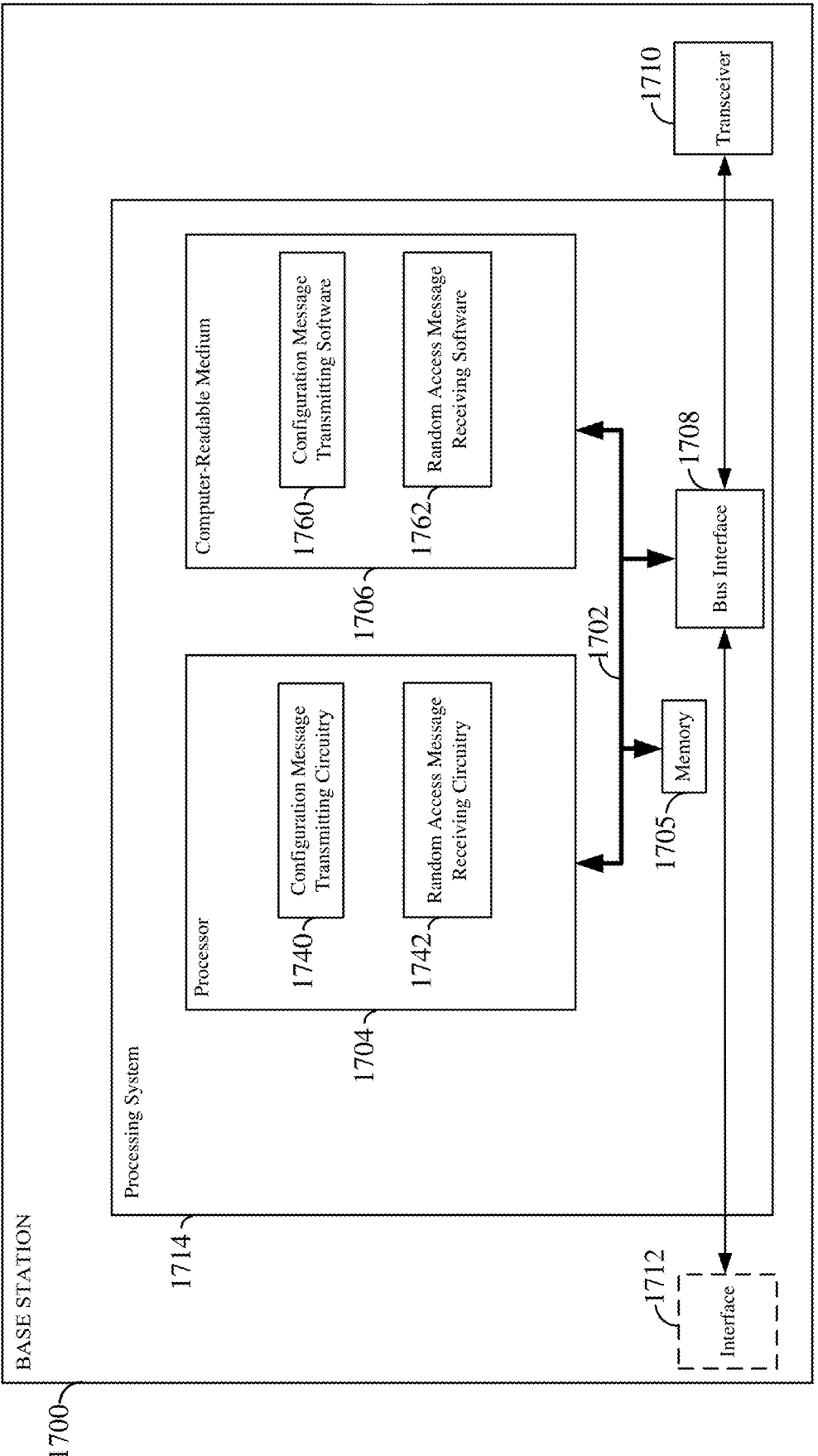
FIG. 17 is a block diagram illustrating an example of a hardware implementation for a base station employing a processing system according to some aspects.

FIG. 17 is a conceptual diagram illustrating an example of a hardware implementation for base station (BS) 1700 employing a processing system 1714. In some implementations, the BS 1700 may correspond to any of the BSs (e.g., gNBs) or scheduling entities shown in any of FIGS. 1, 2, 5-7, 13 and 17.

In accordance with various aspects of the disclosure, an element, or any portion of an element, or any combination of elements may be implemented with the processing system 1714. The processing system may include one or more processors 1704. The processing system 1714 may be substantially the same as the processing system 1414 illustrated in FIG. 14, including a bus interface 1708, a bus 1702, memory 1705, a processor 1704, and a computer-readable medium 1706. Furthermore, the BS 1700 may include an interface 1712 (e.g., a network interface) that provides a means for communicating with at least one other apparatus within a core network and with at least one radio access network.

The BS 1700 may be configured to perform any one or more of the operations described herein (e.g., as described above in conjunction with FIGS. 1-13 and as described below in conjunction with FIG. 18). In some aspects of the disclosure, the processor 1704, as utilized in the BS 1700, may include circuitry configured for various functions.

The processor 1704 may be configured to generate, schedule, and modify a resource assignment or grant of time-frequency resources (e.g., a set of one or more resource elements). For example, the processor 1704 may schedule time-frequency resources within a plurality of time division duplex (TDD) and/or frequency division duplex (FDD) subframes, slots, and/or mini-slots to carry user data traffic and/or control information to and/or from multiple UEs.

The processor 1704 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1704 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1704 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1704 may be configured to schedule PUSCH resources for the uplink beam refinement request in response to receiving a scheduling request from the UE.

The processor 1704 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1704 may include configuration message transmitting circuitry 1740 configured for various functions, including, for example, transmitting at least one configuration message to enable a UE to identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices. For example, the configuration message transmitting circuitry 1740 may be configured to implement one or more of the functions described below in relation to FIG. 18, including, e.g., block 1802. In some examples, the configuration message transmitting circuitry 1740 may include functionality for a means for transmitting (e.g., as described in block 1802 in FIG. 18).

In some aspects of the disclosure, the processor 1704 may include random access message receiving circuitry 1742 configured for various functions, including, for example, receiving a random access message based on the RACH configuration. For example, the random access message receiving circuitry 1742 may be configured to implement one or more of the functions described below in relation to FIG. 18, including, e.g., block 1804. In some examples, the random access message receiving circuitry 1742 may include functionality for a means for receiving (e.g., as described in block 1804 in FIG. 18).

In one or more examples, the computer-readable storage medium 1706 may include configuration message transmitting software 1760 configured for transmitting at least one configuration message to enable a UE to identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices. For example, the configuration message transmitting software 1760 may be configured to implement one or more of the functions described below in relation to FIG. 18, including, e.g., block 1802.

In one or more examples, the computer-readable storage medium 1706 may further include random access message receiving software 1762 configured for receiving a random access message based on the RACH configuration. For example, the random access message receiving software 1762 may be configured to implement one or more of the functions described below in relation to FIG. 18, including, e.g., block 1804.

Therefore, the aspects described herein may provide different ways for a UE (e.g., an access stratum (AS) of the UE) to identify network slice information (e.g., for data arriving at an uplink buffer of the UE 1304) prior to an attempt to access the network (e.g., via a random access procedure). In some aspects, the UE may use at least the identified network slice information or an access identity of the UE to select an appropriate RACH configuration (e.g., a RACH configuration including prioritized RACH parameters) when the UE attempts to access the network (e.g., a base station). Accordingly, the aspects described herein may improve network resource usage and prioritization at least with respect to UE network access attempts.

FIG. 18 is a flow chart illustrating an example wireless communication method 1800 according to some aspects of the disclosure. As described herein, some or all illustrated features may be omitted in a particular implementation within the scope of the present disclosure, and some illustrated features may not be required for implementation of all embodiments. In some examples, the method 1800 may be carried out by the BS 1700 illustrated in FIG. 17. In some examples, the method 1800 may be carried out by any suitable apparatus or means for carrying out the functions or algorithm described below.

At block 1802, a BS may transmit at least one configuration message to enable a UE to identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices. In some examples, the at least one configuration message may include the messages 1308, 1310, 1312, 1314, and/or 1316 described with reference to FIG. 13.

In some examples, the at least one configuration message includes a mapping (e.g., the mapping in the mapping table 1000 in FIG. 10) between the access category of the UE and the one or more network slices, wherein the mapping enables the UE to identify the one or more network slices using the access category. In some examples, the at least one configuration message is transmitted in a non-access stratum (NAS) message, a system information block (SIB), or a radio resource configuration (RRC) message. In some examples, the identifier of the one or more network slices includes single network slice selection assistance information (S-NSSAI), a slice/service type (SST), or a slice group identifier. In some examples, the slice group identifier is mapped to one or more S-NSSAIs.

In some examples, the at least one configuration message includes a mapping (e.g., the mapping in the mapping table 1100 in FIG. 11) between the index value and the one or more network slices. In some examples, the at least one configuration message is transmitted in a non-access stratum (NAS) message or a radio resource configuration (RRC) message.

In some examples, the set of RACH configurations includes at least one of a first RACH configuration indicating at least a first set of prioritized RACH parameters for the access identity, or a second RACH configuration indicating at least a second set of prioritized RACH parameters for the one or more network slices. In some examples, the at least one configuration message includes a first selection configuration or a second selection configuration. In some examples, the first selection configuration configures the UE to select the first RACH configuration from the set of RACH configurations when the access identity indicates that the UE is configured for a multimedia priority service (MPS) or a mission critical service (MCS). In some examples, the second selection configuration configures the UE to select the second RACH configuration from the set of RACH configurations when the one or more network slices include at least one network slice for a high priority service.

In some examples, the at least one configuration message includes a mapping (e.g., the mapping in the mapping table 1200 in FIG. 12) between at least one of the access identity of the UE or the one or more network slices, and the RACH configuration in the set of RACH configurations, wherein the mapping enables the UE to select the RACH configuration using at least one of the access identity of the UE or the one or more network slices. In some examples, the at least one configuration message includes a selection configuration command indicating to apply the first selection configuration or the second selection configuration, wherein the at least one configuration message is transmitted in a non-access stratum (NAS) message, a system information block (SIB), or a radio resource configuration (RRC) message.

At block 1804, the BS may receive a random access message based on the RACH configuration.

In one configuration, the BS 1700 for wireless communication includes means for transmitting at least one configuration message to enable a UE to identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices, and means for receiving a random access message based on the RACH configuration. In one aspect, the aforementioned means may be the processor(s) 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1, 2, 5-7, and/or 13, and utilizing, for example, the processes and/or algorithms described herein in relation to FIG. 18.

The following provides an overview of aspects of the present disclosure:

Aspect 1: A method of wireless communication for a user equipment (UE), comprising: identifying one or more network slices based on at least one of an access category of the UE, an identifier of the one or more network slices, or an index value of the one or more network slices; selecting a random access channel (RACH) configuration from a set of RACH configurations based on at least one of an access identity of the UE or the identified one or more network slices; and transmitting a random access message based on the RACH configuration.

Aspect 2: The method of aspect 1, further comprising: obtaining, at an access stratum (AS) of the UE, at least one of the access category of the UE, the identifier of the one or more network slices, or the index value of the one or more network slices from a non-access stratum (NAS).

Aspect 3: The method of aspect 1 or 2, further comprising: obtaining a mapping between the access category of the UE and the one or more network slices, wherein the one or more network slices are identified using the access category and the mapping.

Aspect 4: The method of aspect 3, wherein the mapping is obtained from a non-access stratum (NAS), a system information block (SIB), or a radio resource configuration (RRC) message.

Aspect 5: The method of any of aspects 1 through 4, wherein the identifier of the one or more network slices includes single network slice selection assistance information (S-NSSAI), a slice/service type (SST), or a slice group identifier.

Aspect 6: The method of aspect 5, wherein the slice group identifier is mapped to one or more S-NSSAIs.

Aspect 7: The method of aspect 1, further comprising: obtaining a mapping between the index value and the one or more network slices, wherein the one or more network slices are identified using the index value and the mapping.

Aspect 8: The method of aspect 7, wherein the mapping is obtained from a non-access stratum (NAS), a radio resource configuration (RRC) message, or preconfigured information at the UE.

Aspect 9: The method of any of aspects 1 through 8, wherein the set of RACH configurations includes at least one of: a first RACH configuration indicating at least a first set of prioritized RACH parameters for the access identity; or a second RACH configuration indicating at least a second set of prioritized RACH parameters for the one or more network slices.

Aspect 10: The method of aspect 9, wherein the selecting the RACH configuration from the set of RACH configurations is based on a first selection configuration or a second selection configuration.

Aspect 11: The method of aspect 10, wherein the selecting the RACH configuration based on the first selection configuration comprises: selecting the first RACH configuration from the set of RACH configurations when the access identity indicates that the UE is configured for a multimedia priority service (MPS) or a mission critical service (MCS).

Aspect 12: The method of aspect 10, wherein the selecting the RACH configuration based on the second selection configuration comprises: selecting the second RACH configuration from the set of RACH configurations when the one or more network slices include at least one network slice for a high priority service.

Aspect 13: The method of any of aspects 1 through 9, wherein the selecting the RACH configuration from the set of RACH configurations comprises: obtaining a mapping between at least one of the access identity of the UE or the identified one or more network slices, and the RACH configuration in the set of RACH configurations; and selecting the RACH configuration based on the mapping.

Aspect 14: The method of aspect 13, wherein the mapping is obtained from a non-access stratum (NAS), a system information block (SIB), or a radio resource configuration (RRC) message.

Aspect 15: The method of aspect 10, further comprising: obtaining a selection configuration command indicating to apply the first selection configuration or the second selection configuration from preconfigured information at the UE, a non-access stratum (NAS), a system information block (SIB), or a radio resource configuration (RRC) message.

Aspect 16: An apparatus for wireless communication, comprising: a memory; and at least one processor coupled to the memory and configured to perform a method of any one of aspects 1 through 15.

Aspect 17: An apparatus for wireless communication comprising at least one means for performing a method of any one of aspects 1 through 15.

Aspect 18: A computer-readable medium storing computer executable code, the code when executed by a processor cause the processor to perform a method of any one of aspects 1 through 15.

Aspect 19: A method for wireless communication at a base station, the method comprising: transmitting at least one configuration message to enable a user equipment to: identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices; and receiving a random access message based on the RACH configuration.

Aspect 20: The method of aspect 19, wherein the at least one configuration message includes a mapping between the access category of the UE and the one or more network slices, wherein the mapping enables the UE to identify the one or more network slices using the access category.

Aspect 21: The method of aspect 19 or 20, wherein the at least one configuration message is transmitted in a non-access stratum (NAS) message, a system information block (SIB), or a radio resource configuration (RRC) message.

Aspect 22: The method of any of aspects 19 through 21, wherein the identifier of the one or more network slices includes single network slice selection assistance information (S-NSSAI), a slice/service type (SST), or a slice group identifier.

Aspect 23: The method of aspect 22, wherein the slice group identifier is mapped to one or more S-NSSAIs.

Aspect 24: The method of aspect 19, wherein the at least one configuration message includes a mapping between the index value and the one or more network slices.

Aspect 25: The method of aspect 24, wherein the at least one configuration message is transmitted in a non-access stratum (NAS) message or a radio resource configuration (RRC) message.

Aspect 26: The method of any of aspects 19 through 25, wherein the set of RACH configurations includes at least one of: a first RACH configuration indicating at least a first set of prioritized RACH parameters for the access identity; or a second RACH configuration indicating at least a second set of prioritized RACH parameters for the one or more network slices.

Aspect 27: The method of aspect 26, wherein the at least one configuration message includes a first selection configuration or a second selection configuration.

Aspect 28: The method of aspect 27, wherein the first selection configuration configures the UE to select the first RACH configuration from the set of RACH configurations when the access identity indicates that the UE is configured for a multimedia priority service (MPS) or a mission critical service (MCS).

Aspect 29: The method of aspect 27, wherein the second selection configuration configures the UE to select the second RACH configuration from the set of RACH configurations when the one or more network slices include at least one network slice for a high priority service.

Aspect 30: The method of aspect 19, wherein the at least one configuration message includes a mapping between at least one of the access identity of the UE or the one or more network slices, and the RACH configuration in the set of RACH configurations, wherein the mapping enables the UE to select the RACH configuration using at least one of the access identity of the UE or the one or more network slices.

Aspect 31: The method of aspect 27, wherein the at least one configuration message includes a selection configuration command indicating to apply the first selection configuration or the second selection configuration, wherein the at least one configuration message is transmitted in a non-access stratum (NAS) message, a system information block (SIB), or a radio resource configuration (RRC) message.

Aspect 32: An apparatus for wireless communication, comprising: a memory; and at least one processor coupled to the memory and configured to perform a method of any one of aspects 19 through 31.

Aspect 33: An apparatus for wireless communication comprising at least one means for performing a method of any one of aspects 19 through 31.

Aspect 34: A computer-readable medium storing computer executable code, the code when executed by a processor cause the processor to perform a method of any one of aspects 19 through 31.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication for a user equipment (UE), comprising:
    identifying one or more network slices based on at least one of an access category of the UE, an identifier of the one or more network slices, or an index value of the one or more network slices;
    selecting a random access channel (RACH) configuration from a set of RACH configurations based on at least one of an access identity of the UE or the identified one or more network slices, wherein the set of RACH configurations includes at least one of:
        a first RACH configuration indicating at least a first set of prioritized RACH parameters for the access identity; or
        a second RACH configuration indicating at least a second set of prioritized RACH parameters for the one or more network slices; and
    transmitting a random access message based on the RACH configuration.

2. The method of claim 1, further comprising:
    obtaining, at an access stratum (AS) of the UE, at least one of the access category of the UE, the identifier of the one or more network slices, or the index value of the one or more network slices from a non-access stratum (NAS).

3. The method of claim 1, further comprising:
    obtaining a mapping between the access category of the UE and the one or more network slices, wherein the one or more network slices are identified using the access category and the mapping.

4. The method of claim 3, wherein the mapping is obtained from a non-access stratum (NAS), a system information block (SIB), or a radio resource configuration (RRC) message.

5. The method of claim 1, wherein the identifier of the one or more network slices includes single network slice selection assistance information (S-NSSAI), a slice/service type (SST), or a slice group identifier.

6. The method of claim 5, wherein the slice group identifier is mapped to one or more S-NSSAIs.

7. The method of claim 1, wherein the selecting the RACH configuration from the set of RACH configurations is based on a first selection configuration or a second selection configuration.

8. The method of claim 7, wherein the selecting the RACH configuration based on the first selection configuration comprises:
    selecting the first RACH configuration from the set of RACH configurations when the access identity indicates that the UE is configured for a multimedia priority service (MPS) or a mission critical service (MCS).

9. The method of claim 7, wherein the selecting the RACH configuration based on the second selection configuration comprises:
    selecting the second RACH configuration from the set of RACH configurations when the one or more network slices include at least one network slice for a high priority service.

10. The method of claim 7, further comprising:
    obtaining a selection configuration command indicating to apply the first selection configuration or the second selection configuration from preconfigured information at the UE, a non-access stratum (NAS), a system information block (SIB), or a radio resource configuration (RRC) message.

11. The method of claim 1, wherein the selecting the RACH configuration from the set of RACH configurations comprises:
    obtaining a mapping between at least one of the access identity of the UE or the identified one or more network slices, and the RACH configuration in the set of RACH configurations; and
    selecting the RACH configuration based on the mapping.

12. The method of claim 11, wherein the mapping is obtained from a non-access stratum (NAS), a system information block (SIB), or a radio resource configuration (RRC) message.

13. A method of wireless communication for a user equipment (UE), comprising:
    identifying one or more network slices based on at least one of an access category of the UE, an identifier of the one or more network slices, or an index value of the one or more network slices;
    selecting a random access channel (RACH) configuration from a set of RACH configurations based on at least one of an access identity of the UE or the identified one or more network slices;
    transmitting a random access message based on the RACH configuration; and
    obtaining a mapping between the index value and the one or more network slices, wherein the one or more network slices are identified using the index value and the mapping.

14. The method of claim 13, wherein the mapping is obtained from a non-access stratum (NAS), a radio resource configuration (RRC) message, or preconfigured information at the UE.

15. A user equipment, comprising:
    a transceiver;
    a memory; and
    at least one processor coupled to the transceiver and the memory, wherein the at least one processor is configured to:
        identify one or more network slices based on at least one of an access category of the UE, an identifier of the one or more network slices, or an index value of the one or more network slices;
        select a random access channel (RACH) configuration from a set of RACH configurations based on at least one of an access identity of the UE or the identified one or more network slices, wherein the set of RACH configurations includes at least one of:
        a first RACH configuration indicating at least a first set of prioritized RACH parameters for the access identity; or
        a second RACH configuration indicating at least a second set of prioritized RACH parameters for the one or more network slices; and
        transmit a random access message based on the RACH configuration.

16. A method for wireless communication for a base station, the method comprising:
    transmitting at least one configuration message to enable a user equipment to:
        identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices, wherein the set of RACH configurations includes at least one of:

a first RACH configuration indicating at least a first set of prioritized RACH parameters for the access identity; or a second RACH configuration indicating at least a second set of prioritized RACH parameters for the one or more network slices; and receiving a random access message based on the RACH configuration.

17. The method of claim 16, wherein the at least one configuration message includes a mapping between the access category of the UE and the one or more network slices, wherein the mapping enables the UE to identify the one or more network slices using the access category.

18. The method of claim 16, wherein the at least one configuration message is transmitted in a non-access stratum (NAS) message, a system information block (SIB), or a radio resource configuration (RRC) message.

19. The method of claim 16, wherein the identifier of the one or more network slices includes single network slice selection assistance information (S-NSSAI), a slice/service type (SST), or a slice group identifier.

20. The method of claim 19, wherein the slice group identifier is mapped to one or more S-NSSAIs.

21. The method of claim 16, wherein the at least one configuration message includes a mapping between the index value and the one or more network slices.

22. The method of claim 21, wherein the at least one configuration message is transmitted in a non-access stratum (NAS) message or a radio resource configuration (RRC) message.

23. The method of claim 16, wherein the at least one configuration message includes a first selection configuration or a second selection configuration.

24. The method of claim 23, wherein the first selection configuration configures the UE to select the first RACH configuration from the set of RACH configurations when the access identity indicates that the UE is configured for a multimedia priority service (MPS) or a mission critical service (MCS).

25. The method of claim 23, wherein the second selection configuration configures the UE to select the second RACH configuration from the set of RACH configurations when the one or more network slices include at least one network slice for a high priority service.

26. The method of claim 23, wherein the at least one configuration message includes a selection configuration command indicating to apply the first selection configuration or the second selection configuration, wherein the at least one configuration message is transmitted in a non-access stratum (NAS) message, a system information block (SIB), or a radio resource configuration (RRC) message.

27. The method of claim 16, wherein the at least one configuration message includes a mapping between at least one of the access identity of the UE or the one or more network slices, and the RACH configuration in the set of RACH configurations, wherein the mapping enables the UE to select the RACH configuration using at least one of the access identity of the UE or the one or more network slices.

28. A base station, comprising:

a transceiver;

a memory; and at least one processor coupled to the transceiver and the memory, wherein the at least one processor is configured to:

transmit at least one configuration message to enable a user equipment to:

identify one or more network slices based on at least one of an access category of the UE, an identifier of the one or more network slices, or an index value of the one or more network slices, and select a random access channel (RACH) configuration from a set of RACH configurations based on at least one of an access identity of the UE or the identified one or more network slices, wherein the set of RACH configurations includes at least one of:

a first RACH configuration indicating at least a first set of prioritized RACH parameters for the access identity; or a second RACH configuration indicating at least a second set of prioritized RACH parameters for the one or more network slices; and receive a random access message based on the RACH configuration.

*    *    *    *    *